(12) United States Patent
Schoch et al.

(10) Patent No.: US 11,841,045 B2
(45) Date of Patent: Dec. 12, 2023

(54) CONNECTION ASSEMBLY

(71) Applicant: Elkamet Kunststofftechnik GmbH, Biedenkopf (DE)

(72) Inventors: Andreas Schoch, Marburg (DE); Juergen Ruehl, Reichelsheim (DE); Marcus Schneider, Dautphetal (DE); David Landeck, Bad Berleburg (DE); Michael Ortmueller, Dautphetal-Herzhausen (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 57 days.

(21) Appl. No.: 17/781,717

(22) PCT Filed: Dec. 8, 2020

(86) PCT No.: PCT/EP2020/085057
§ 371 (c)(1),
(2) Date: Jun. 2, 2022

(87) PCT Pub. No.: WO2021/116096
PCT Pub. Date: Jun. 17, 2021

(65) Prior Publication Data
US 2023/0003241 A1 Jan. 5, 2023

(30) Foreign Application Priority Data
Dec. 9, 2019 (DE) ...................... 10 2019 133 589.2

(51) Int. Cl.
*F16B 5/06* (2006.01)
*F16B 5/12* (2006.01)

(52) U.S. Cl.
CPC .......... *F16B 5/0642* (2013.01); *F16B 5/0685* (2013.01); *F16B 5/128* (2013.01)

(58) Field of Classification Search
CPC .... F16B 5/0664; F16B 5/0607; F16B 21/084; F16B 21/073; F16B 21/078; F16B 21/088;
(Continued)

(56) References Cited

U.S. PATENT DOCUMENTS 9,126,635 B2 * 9/2015 Sano ................... B60J 10/70
9,994,094 B2 * 6/2018 Ortmueller ............ B60J 10/70
(Continued)

FOREIGN PATENT DOCUMENTS

DE 102017003420 A1 * 10/2018 .......... A47C 31/023
EP 3103665 A1 12/2016
(Continued)

*Primary Examiner* — Jason L Vaughan
(74) *Attorney, Agent, or Firm* — LEYDIG, VOIT & MAYER, LTD.

(57) ABSTRACT

A connection assembly includes first and second components which, starting from a separated disassembled state, are joinable to each other along a plane of relative movement parallel to respective planes of extension of the components into an interconnected assembled state, and are transferrable back into the disassembled state. The first component has a latching element on either side of the plane of relative movement, and the second component has two latching element receptacles. In the assembled state, each of the latching element receptacles cooperates with a respective latching portion of a respective one of the latching elements. The latching portions are movable along a movement path starting from a non-deformed rest state. A first portion of the movement path pointing in a disassembly direction with respect to the rest state is limited by stop surfaces against which the respective latching elements rest in a course of disassembling the components.

21 Claims, 22 Drawing Sheets

(58) Field of Classification Search
CPC ............ B65D 2251/20; B65D 43/0216; B65D 43/0214; B65D 43/022; B65D 43/0206; F16L 23/162; F16L 15/04; A44B 17/0011; A44B 17/0017
See application file for complete search history.

(56) References Cited

U.S. PATENT DOCUMENTS

| | | | |
|---|---|---|---|
| 2011/0115261 A1* | 5/2011 | Platt | B60J 10/265 |
| | | | 296/208 |
| 2011/0285177 A1* | 11/2011 | Flammer | B60J 10/265 |
| | | | 296/208 |
| 2014/0327267 A1* | 11/2014 | Deussen | B60J 10/20 |
| | | | 296/93 |
| 2018/0105026 A1 | 4/2018 | Ortmueller et al. | |

FOREIGN PATENT DOCUMENTS

| | | | | |
|---|---|---|---|---|
| FR | 3053744 A1 * | 1/2018 | ........... | B61D 17/043 |
| WO | WO 2015033202 A1 | 3/2015 | | |

* cited by examiner

US 11,841,045 B2

CONNECTION ASSEMBLY

CROSS REFERENCE TO RELATED APPLICATIONS

This application is a U.S. National Phase application under 35 U.S.C. § 371 of International Application No. PCT/EP2020/085057, filed on Dec. 8, 2020, and claims benefit to German Patent Application No. DE 10 2019 133 589.2, filed on Dec. 9, 2019. The International Application was published in German on Jun. 17, 2021 as WO 2021/116096 A1 under PCT Article 21(2).

FIELD

The invention relates to a connection assembly having two components that can be joined to each other using one or more latching elements and one or more latching element receptacles.

The connection assembly is preferably suitable for components in the form of elongated bodies, in particular for profile elements, strips, laths, or panels.

The connection assembly is also especially suited for elongated bodies in the form of structural profiles (for example, the so-called "ITEM" profiles of the company item Industrietechnik GmbH, Solingen, Germany, or the so-called "BOSCH" profiles of the company Bosch Rexroth AG, Lohr am Main, Germany).

SUMMARY

In an embodiment, the present disclosure provides a connection assembly that includes a first component in a form of an elongated body, the first component extending along a first longitudinal extension axis, and a second component in a form of an elongated body, the second component extending along a second longitudinal extension axis. The first and second components, starting from a separated disassembled state, are joinable to each other along a plane of relative movement parallel to respective planes of extension of the first and second components into an interconnected assembled state, and are transferrable back into the disassembled state. The first component has at least one latching element on either side of the plane of relative movement, and the second component has two latching element receptacles. In the assembled state, each of the latching element receptacles cooperates with a respective latching portion of a respective one of the latching elements. Each of the latching portions is movable along a movement path starting from a non-deformed rest state. The movement path has at least a component parallel to the plane of relative movement, a first portion of the movement path pointing in a disassembly direction with respect to the rest state, and a second portion of the movement path pointing in an assembly direction opposite the disassembly direction with respect to the rest state. The first portion of the movement path is limited by stop surfaces against which the respective latching elements rest in a course of disassembling the first and second components.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 4b is a cross-sectional view of the connection assembly of FIG. 4a;

FIG. 16b is a cross-sectional view of the connection assembly of FIG. 16a;

FIG. 17b is an exploded view of the connection assembly of FIG. 17a;

FIG. 17c is a cross-sectional view of the connection system of FIG. 17a;

DETAILED DESCRIPTION

Figure 1:
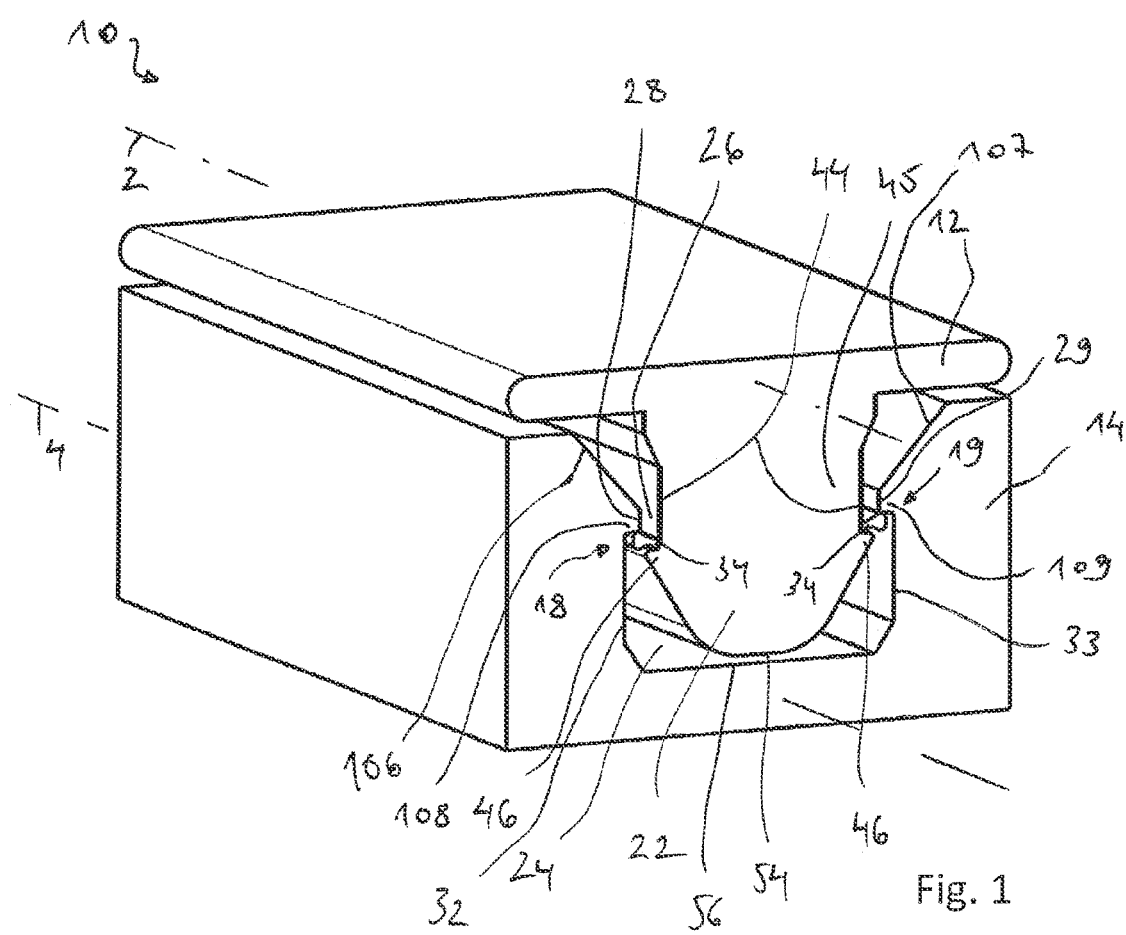
FIG. 1 is a perspective view showing a first embodiment of a connection assembly in an assembled state.

In accordance with embodiments of the invention, two movement paths are provided along which the latching portions of the two latching elements can move, the movement paths each having at least a component parallel to the axis of relative movement. Starting from a non-deformed rest state of the latching elements, their respective latching portions are each movable in two opposite directions. In this context, the terms "disassembly direction" and "assembly direction" refer to movement of the second component relative to the first component, assuming that the first component is stationary. At least the first portion of the respective movement path of a latching portion of each of the latching elements, which first portion points in the direction of disassembly with respect to the rest state, is limited by a respective stop surface against which a respective latching element rests in the course of disassembling the components.

The two stop surfaces are formed by two separate portions of the first component which are disposed on opposite sides of the plane of relative movement. Advantageously, the stop surfaces extend transversely, preferably perpendicularly, to the plane of relative movement.

By providing the mentioned movement possibilities for the latching portions of the two latching elements, the assembly forces required to join the connection assembly are relatively small. The provision of the stop surfaces makes it possible to hamper disassembly of the connection assembly in such a way that high holding forces act when the connection assembly is in the assembled state. Therefore, in order to release the connection assembly, relatively high disassembly forces must be exerted.

It is advantageous if the length of the first portion of the movement path of a latching portion differs from the length of the second portion of the movement path of this latching portion, so that different assembly and disassembly forces can be predetermined by the lengths of the respective movement paths. It is particularly preferred if the length of the first portion of the movement path is shorter than the length of the second portion of the movement path. This is in particular associated with the disassembly forces for releasing the connection assembly being higher than the assembly forces for joining the connection assembly.

Advantageously, the latching elements are springy in their entirety or at least in a portion thereof. It is preferred that the latching elements, or at least portions thereof, be made of a springy material, for example of a thermoplastic elastomer. However, the latching elements may also be made of other plastic materials or also of metallic materials.

Furthermore, it is preferred if the latching elements, when in their rest state with respect to the plane of relative movement, extend along a plane that is oblique or perpendicular to the plane of relative movement. By this orientation, the ratio between the assembly force and the disassembly force may possibly be additionally influenced.

Further, it is preferred if the latching elements each extend between a mounting portion and a free end when viewed in a cross-sectional plane perpendicular to the plane of relative movement, the respective mounting portion being connected to the first component, and the respective free end being pivotable relative to the respective mounting portion along or parallel to the respective movement path. This enables stable attachment of the latching elements to the first component.

It is preferred that a latching portion of a latching element that cooperates with a latching element receptacle of the second component be disposed in the region of the free end of the latching element or adjacent thereto.

For a cross-sectional shape of the latching elements as described above, a first pivot angle corresponding to the respective first portion of the respective movement path may be at least about 5° and/or no more than about 100°. With the mentioned angular ranges, it is possible to combine high holding forces with moderate disassembly forces.

It is also proposed that a second pivot angle corresponding to the respective second portion of the respective movement path be at least about 10°. In this way, relatively low assembly forces can be obtained.

Advantageously, the latching element receptacles are formed by respective material projections of the second component, each material projection having an undercut for receiving a respective latching portion of a respective latching element.

Advantageously, the latching elements of the connection assembly are oriented such that they do not intersect the plane of relative movement and are each exclusively disposed on a respective one of the two sides of the plane of relative movement. Thus, the connection assembly does not have any latching element extending through the plane of relative movement.

Embodiments of the invention relate to preferred geometries and methods of manufacturing the components, at least one of the components being configured as an elongated body, for example as a structural profile, in particular in the form of an ITEM profile or a Bosch profile.

An embodiment of the invention provides that two times the thickness (D) is at least equal to the difference between the entrance width (A) and the head width (B), as discussed below, which in conjunction with the features that one of the components (12 or 14) has a groove-shaped web receptacle (24) having a web receptacle width (L) measured perpendicular to the plane of relative movement (16), the web receptacle (24) being accessible to a free end (54) of a web (22) of the other of the components (12 or 14) through an entrance (26) having an entrance width (A) measured perpendicular to the plane of relative movement (16), the free end (54) having a maximum head width (B) measured perpendicular to the plane of relative movement (16), the free end (54) being disposed adjacent to a web stem (45) of reduced cross section having a width (C) measured perpendicular to the plane of relative movement (16), the latching portions (36, 38) of the latching elements (18, 19) each having a thickness (D) measured parallel to the plane of relative movement (16), as discussed below, has the advantage of increased resistance to disassembly.

An embodiment of the invention provides that two times the thickness (D) is no greater than the difference between the entrance width (A) and the stem width (C) and/or in that two times the thickness (D) is no greater than the difference between the web receptacle width (L) and the head width (B), as discussed below, which in conjunction with the features that one of the components (12 or 14) has a groove-shaped web receptacle (24) having a web receptacle width (L) measured perpendicular to the plane of relative movement (16), the web receptacle (24) being accessible to a free end (54) of a web (22) of the other of the components (12 or 14) through an entrance (26) having an entrance width (A) measured perpendicular to the plane of relative movement (16), the free end (54) having a maximum head width (B) measured perpendicular to the plane of relative movement (16), the free end (54) being disposed adjacent to a web stem (45) of reduced cross section having a width (C) measured perpendicular to the plane of relative movement (16), the latching portions (36, 38) of the latching elements (18, 19) each having a thickness (D) measured parallel to the plane of relative movement (16), as discussed below, promotes easy assembly of the first and second components.

Embodiments of the invention provide that at least one of the components (12, 14) is an in particular plate-like flat body (6) or a baseboard (206), or is formed by a double-web strip (210) or by an adapter-like intermediate part (220), or in that both components (12, 14) form chain links of a chain link assembly (320), as discussed below, a which alternatives relate to preferred component configurations where it is particularly advantageous when disassembly is more difficult than assembly.

An embodiment of the invention provides that a relative position adjustment device (214) is provided that is at least indirectly connected to the first component (12) or to the second component (14), the relative position of at least a portion of the first component (12) and at least a portion of the second component (14) being adjustable along an assembly/disassembly axis parallel to the plane of relative movement (16) by means of the relative position adjustment device (214) when the connection assembly (10) is in the assembled state, as discussed below, which has the advantage that the components can be adjusted in position relative to each other. Such adjustability can be used in particular to disassemble two interconnected components and/or to compensate for assembly clearance between the two components.

An embodiment of the invention provides that a pin or wedge element (224) acting between the latching elements (18 and 19) is provided for adjusting a distance between the latching elements (18, 19), as discussed below, which contributes to increased stability of an assembled state.

An embodiment of the invention provides that the connection assembly comprises at least two components (14, 14a, 14b) in the form of elongated bodies whose longitudinal extension axes (212) are perpendicular, parallel or collinear to one another, as discussed below, which is particularly suited for elongated bodies in the form of a structural profile, for example an ITEM profile or a Bosch profile.

An embodiment of the invention also relates to a connection system including at least two of the afore-discussed connection assemblies. In this connection, preferably, a (at least one) first component or a (at least one) second component is associated with both connection assemblies at the same time. Such a connection system is particularly advantageous for arrangements including components which abut against each other in a corner area.

Figure 2:
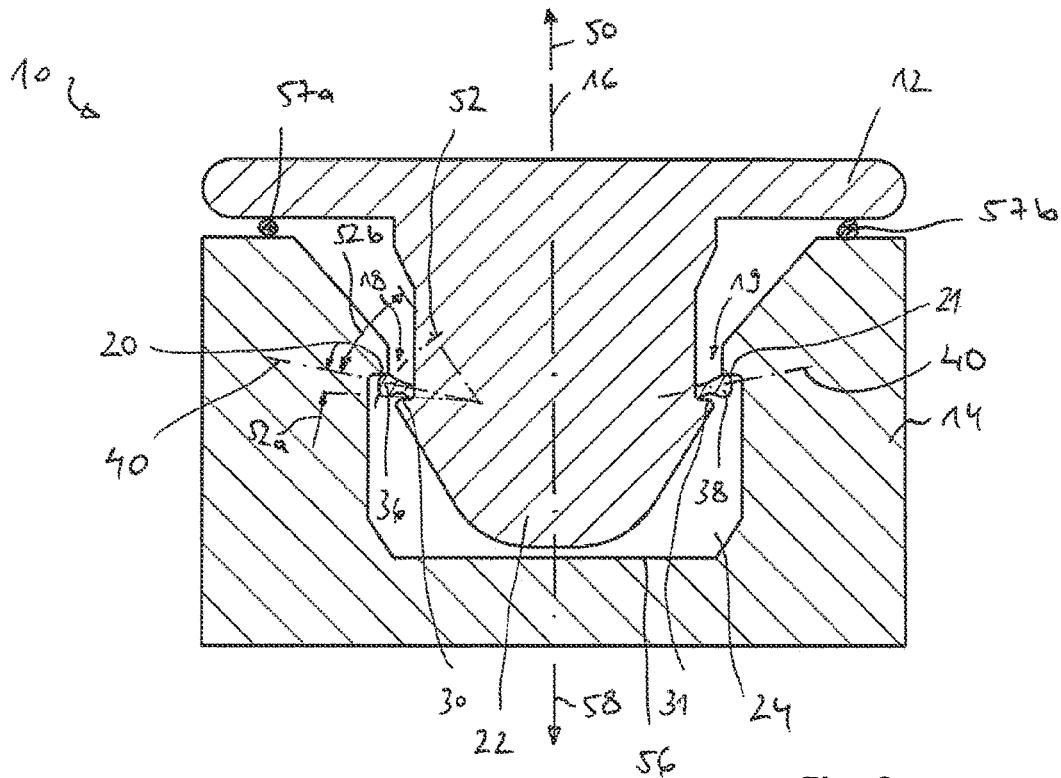
FIG. 2 is a cross-sectional view showing the connection assembly of FIG. 1 in an assembled state.
Figure 3:
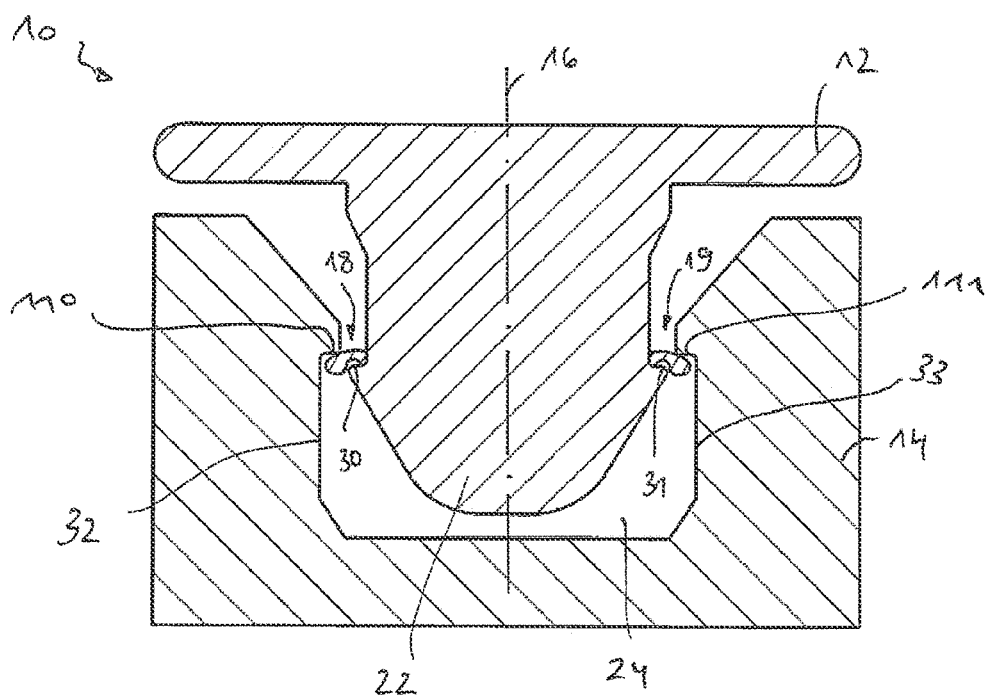
FIG. 3 is a cross-sectional view corresponding to FIG. 2 during disassembly.

A first embodiment of a connection assembly, illustrated in FIGS. 1 through 3, is designated in its entirety by reference numeral 10 in the drawing. Connection assembly 10 includes a first component 12 in the form of an elongated body and a second component 14 in the form of an elongated body. Components 12, 14 each extend along a respective longitudinal extension axis 2, 4. Longitudinal extension axes 2 and 4 preferably extend parallel to each other.

First component 12 has a web 22 extending parallel to longitudinal extension axis 2. Second component 14 has a web receptacle 24 extending parallel to longitudinal extension axis 4.

In a cross section of first component 12 (taken perpendicular to longitudinal extension axis 2), web 22 extends from a free end 54 up to two material projections 46, which are adjoined by respective inwardly offset side surfaces 44 of a web stem 45. Latching elements 18, 19, which preferably extend parallel to longitudinal extension axis 2, are each disposed in a respective transition region between a respective material projection 46 and web stem 45.

Latching elements 18, 19 are fixedly secured by a respective mounting portion 34 in the mentioned regions of first component 12 and each extend in a respective plane 40 (see FIG. 2). The two planes 40 may be inclined with respect to a plane of relative movement 16 of the two components 12 and 14 and may be oriented mirror-symmetrically with respect to the plane of relative movement 16.

Latching elements 18, 19 include latching portions 36, 38 which are disposed outwardly relative to their mounting portions 34.

The orientation of planes 40 refers to a non-deformed rest state of latching elements 18, 19. Starting from the respective rest state of latching elements 18, 19, latching portions 36, 38 are pivotable about or relative to the respective mounting portion 34 along a first portion 52a of a movement path 52 up to respective stop surfaces 30 formed by respective ones of the material projections 46 of web 22. Furthermore, latching portions 36, 38 are pivotable, starting from their respective rest state, along a second portion 52b of movement path 52; i.e., in a direction toward web stem 45.

Second component 14 has two, preferably inclined, ramp surfaces 106 and 107, which extend parallel to longitudinal extension axis 4 and lead into an entrance 26 of web receptacle 24. Entrance 26 is bounded by two opposite side surfaces 28, 29. Side surfaces 28, 29 are each formed by an inwardly extending material projection 108, 109, each material projection 108, 109 having an undercut surface 110, 111 formed on its side facing away from the respective ramp surface 106, 107 (see FIG. 3). Undercut surfaces 110, 111 each extend from a respective side surface 28, 29 outwardly up to opposite boundary surfaces 32, 33 of web receptacle 24. Undercut surfaces 110, 111 each form a latching element receptacle 20, 21 for a respective latching portion 36, 38 of a latching element 18, 19.

First component 12 and second component 14 can be joined together, starting from a disassembled state of connection assembly 10. In this context, an assembly direction 50 oriented parallel to the plane of relative movement 16 is relative to second component 14. However, it is of course also possible that second component 14 is not moved and that only the first component is moved, or that both components 12 and 14 are moved toward each other. However, when seen from second component 14, the resulting assembly direction 50 is always that shown in FIG. 2 and refers to the movement of second component 14 relative to first component 12.

Starting from a separated disassembled state, a movement of components 12 and/or 14 as described above causes latching portions 36, 38 of latching elements 18, 19 to make contact with respective ramp surfaces 106, 107 during the assembly process, and to be pivoted about or relative to their respective mounting portions 34 along second portion 52b of movement path 52, starting from the respective non-deformed rest state of latching elements 18, 19.

In a subsequent assembly phase, web 22 is inserted into web receptacle 24 to such an extent that latching portions 36, 38 of latching elements 18, 19 are no longer in contact with ramp surfaces 106, 107, but have been pivoted along their second portion 52b of movement path 52 to a point where they enter into entrance 26 of web receptacle 24, which is bounded by side surfaces 28, 29.

At the end of the assembly process, web 22 has been received into web receptacle 24 to such an extent that latching portions 36, 38 of latching elements 18, 19 move out of engagement with the side surfaces 28, 29 of the material projections 108, 109 and are each received in a respective latching element receptacle 20, 21. As this occurs, latching elements 18, 19 preferably assume a non-deformed (relaxed) rest state again.

In this assembled state of connection assembly 10, shown in FIG. 2, latching portions 36, 38 may contact undercut surfaces 110, 111 or be spaced a small distance from these undercut surfaces 110, 111. Such a distance may be defined, for example, by free end 54 of web 22 resting against a boundary surface 56 of web receptacle 24 and/or by disposition of sealing strips 57a, 57b, which are disposed on both sides of the plane of relative movement 16 and which provide a sealing effect between first component 12 and second component 14 (see FIG. 2).

Starting from the assembled state of connection assembly 10 shown in FIG. 2, disassembly is carried out in a disassembly direction denoted by 58 with respect to second component 14. As discussed above, it is possible that in the assembled state of connection assembly 10, latching portions 36, 38 may be in contact with the respective undercut surfaces 110, 111 or be spaced a distance from the respective undercut surfaces 110, 111. In case such a distance is provided, this distance is reduced in a first disassembly phase until latching portions 36, 38 make contact with the respective undercut surfaces 110, 111. During this phase, latching elements 18, 19 remain in their respective non-deformed rest state. Once the latching portions 36, 38 are in contact with undercut surfaces 110, 111, further relative movement of the components 12 and 14 along the plane of relative movement 16 causes latching portions 36, 38 to deform along their respective first portion 52a of their movement path 52 until latching elements 18, 19 or latching portions 36, 38 make contact with the stop surfaces 30, 31 formed by the material projections 46 (see FIG. 3).

Further movement of components 12 and 14 along the plane of relative movement 16 beyond the state shown in FIG. 3 causes latching portions 36, 38 to move out of contact with undercut surfaces 110, 111 and to then enter into the region of entrance 26 of web receptacle 24, thereby each being disposed on or between one of the side surfaces 28, 29 and one of the material projections 46 of first component 12. Depending on the relative sizes, latching portions 36 and 38 may also be temporarily squeezed in the gap between a respective material projection 46 of web 22 and a respective material projection 108, 109 of web receptacle 24 during this process.

Further relative movement then causes latching portions 36, 38 to move out of engagement with the respective side surfaces 28, 29 and, finally, to be spaced a distance from the respective ramp surfaces 106, 107, so that latching elements 18, 19 can assume their respective non-deformed rest state again.

Figure 4A:
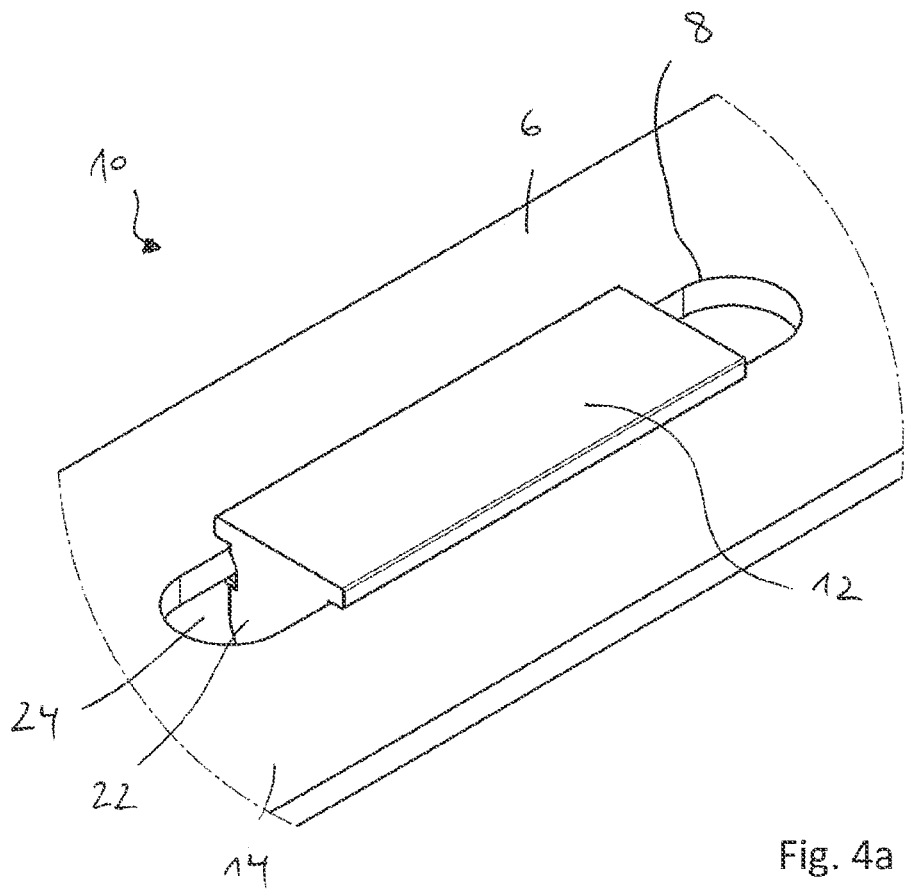
FIG. 4a is a perspective view showing a second embodiment of a connection assembly in an assembled state.
Figure 4B:
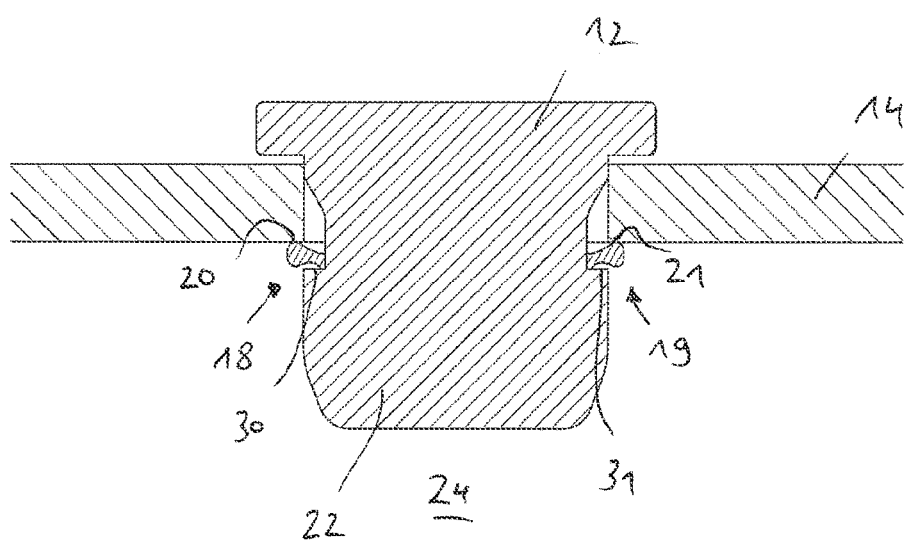

The second embodiment shown in FIGS. 4a and 4b, as compared to the aforedescribed embodiment, has the specific feature that web receptacle 24 of second component 14 is formed by a slotted hole 8 of a flat body 6, the flat body 6 itself not being provided with any further latching means, such as projections or undercuts. The undercut surfaces 110, 111 shown in FIGS. 1 to 3 are here formed by the flat body's material adjacent the slotted hole. The thickness of flat body 6 and the length of web 22 must be matched in such a way that, after the connection according to an embodiment of the invention is created, latching elements 18, 19 can assume the non-deformed rest state again which prevails before the two components 12, 14 are brought into engagement with each other (disassembled state).

Figure 5:
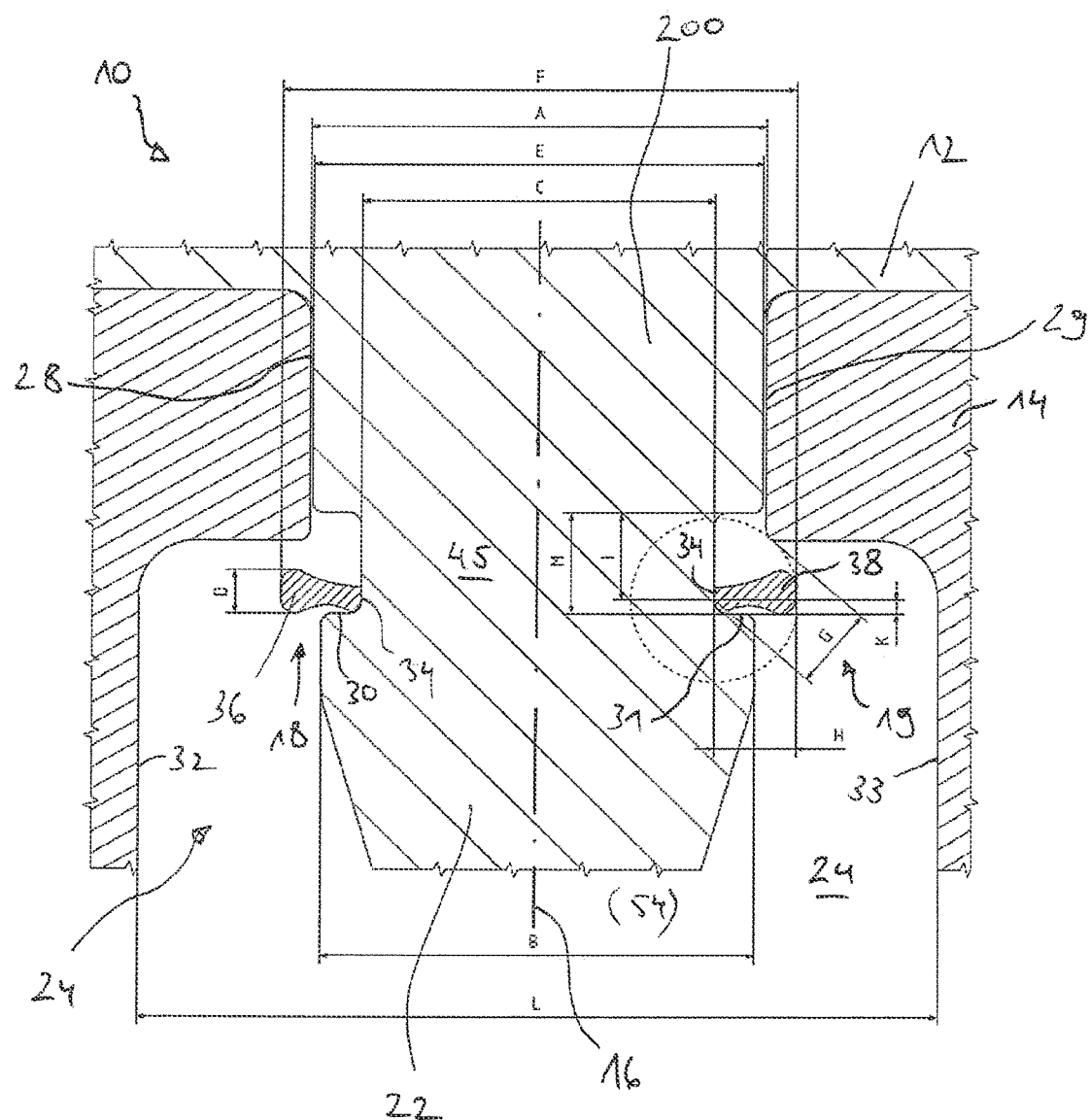
FIG. 5 is a cross-sectional view of the connection assembly of FIG. 1.

FIG. 5 shows, by way of example, some of the dimensions that are relevant for latching engagement of components 12 and 14. Letters A through M denote the following dimensions:

A=slot aperture size
B=web end portion for lip support
C=web constriction
D=lip thickness
E=web width
F=overall size
G=web insertion depth
H=lip length
I=length of the web constriction for lip support
K=lip distance from the support surface
L=slot width
M=total length of the web constriction In the examples shown, the above-mentioned slot aperture size represents the aperture size of entrance 26 of web receptacle 24; i.e., an entrance width A of the entrance 26 bounded between side surfaces 28 and 29 (see FIG. 1) as measured perpendicular to the plane of relative movement 16.

The above-mentioned dimension B, "web end portion for lip support," corresponds to a maximum head width of web 22 as measured perpendicular to the plane of relative movement 16.

The above-mentioned dimension C, "web constriction," corresponds to a width of the web stem 45 of web 22 as measured perpendicular to the plane of relative movement 16 at the level of the two mounting portions 34.

The above-mentioned dimension D, "lip thickness," corresponds to a thickness of a latching portion 36, 38 of a latching element 18, 19 as measured parallel to the plane of relative movement 16 in the non-deformed rest state.

The above-mentioned dimension E, "web width," corresponds to a distance measured perpendicular to the plane of relative movement 16 between the outer surfaces of an enlargement 200 of web stem 45 of web 22, which outer surfaces face away from each other.

The above-mentioned dimension F, "overall size," corresponds to a distance measured perpendicular to the plane of relative movement 16 between respective end faces of latching portions 36 and 38 of latching elements 18 and 19.

The above-mentioned dimension G, "web insertion depth," indicates a minimum dimension relative to dimension H required to provide a latching function of latching elements 18, 19.

The above-mentioned dimension H, "lip length," corresponds to a length of latching elements 18 and 19 as measured perpendicular to the plane of relative movement 16 in the non-deformed rest state.

The above-mentioned dimension I, "length of the web constriction for lip support," corresponds to a difference between the dimensions M and K as measured parallel to the plane of relative movement 16.

The above-mentioned dimension K, "lip distance from the support surface," corresponds to a distance of a latching element 18, 19 from a respective adjacent stop surface 30, 31 as measured parallel to the plane of relative movement 16 in the non-deformed rest state.

The above-mentioned dimension L, "slot width," corresponds to a web receptacle width (distance between boundary surfaces 32 and 33 of web receptacle 24) as measured perpendicular to the plane of relative movement 16.

The above-mentioned dimension M, "total length of the web constriction," corresponds to a height of the web stem 45 of web 22 as measured parallel to the plane of relative movement 16.

In particular, the following ratios between individual dimensions are advantageous for the assembly process (i.e., the latching engagement or joining of components 12 and 14) or for the disassembly process (i.e., the disengagement or separation of components 12 and 14):

engagement function:

$$\frac{A-C}{2D} \geq 1$$

engagement function:

$$\frac{I}{H} \geq 1$$

engagement function:

$$\frac{G}{H} \geq 1$$

disengagement function:

$$\frac{A-B}{2D} \leq 1$$

disengagement function:

$$\frac{K}{H} < 1$$

engagement and disengagement function: L≥C+2H

In this connection, the condition F/A>1 constitutes the prerequisite for latching engagement of components 12, 14.

Figure 6:
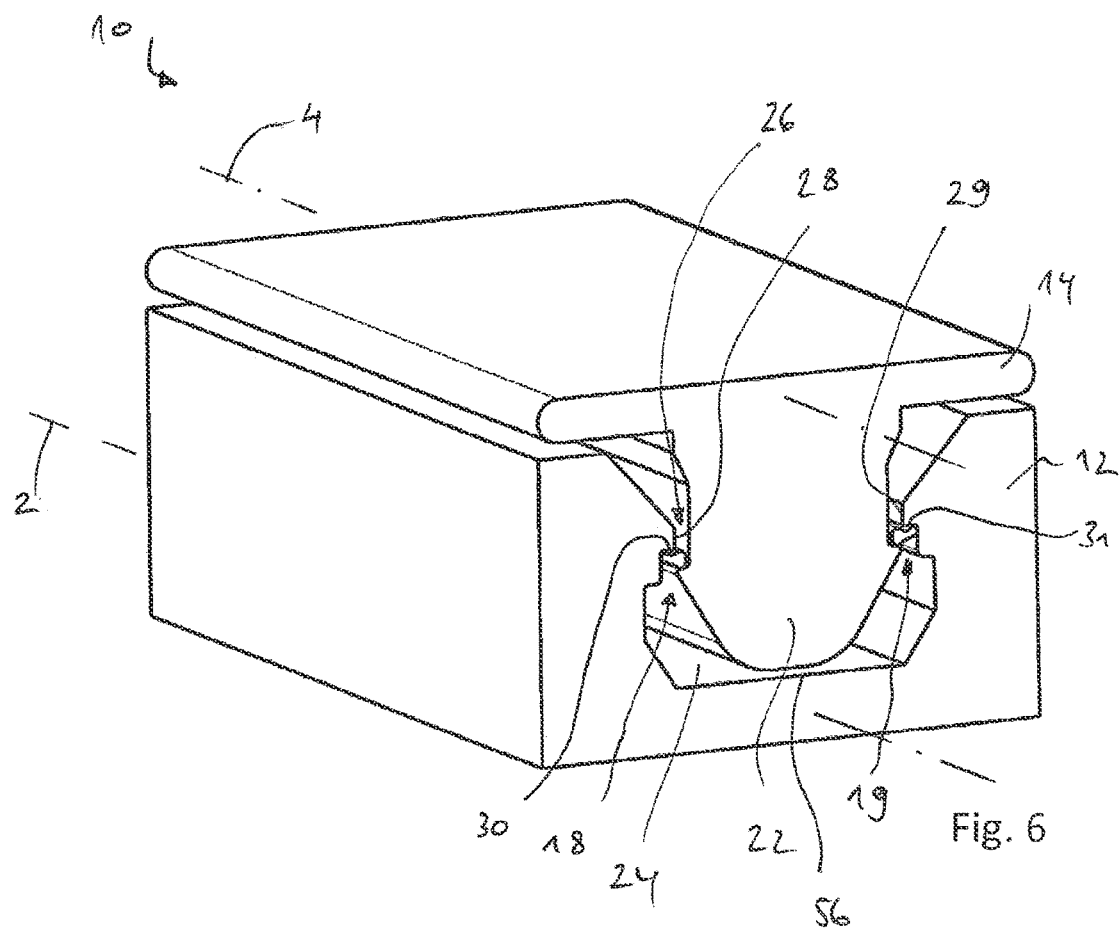
FIG. 6 is a perspective view showing a third embodiment of a connection assembly in an assembled state.
Figure 7:
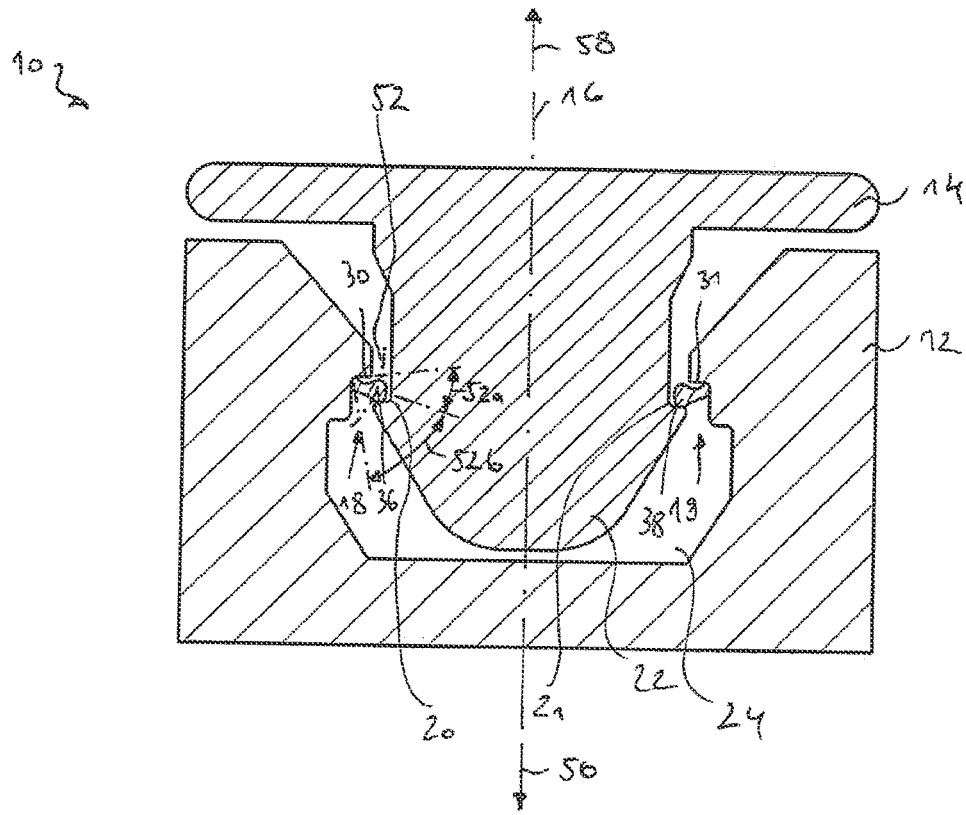
FIG. 7 is a cross-sectional view showing the connection assembly of FIG. 6 in an assembled state.
Figure 8:
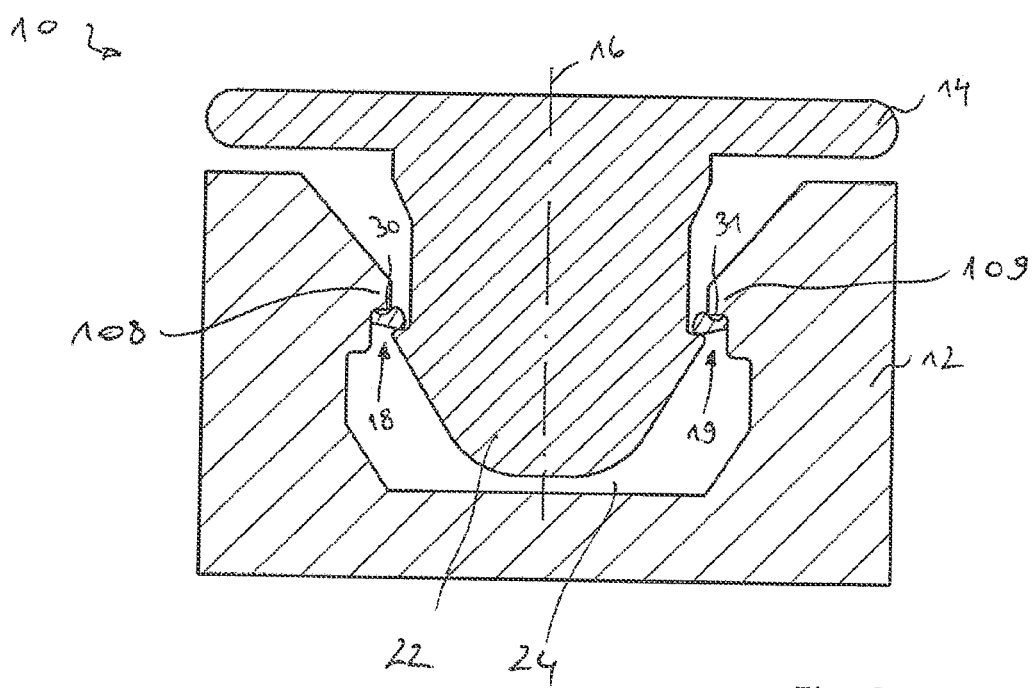
FIG. 8 is a cross-sectional view corresponding to FIG. 7 during disassembly.

A third embodiment of a connection assembly 10, shown in FIGS. 6 through 8, differs from the aforedescribed embodiments in that first component 12 has a web receptacle 24, while second component 14 has a web 22. Latching elements 18, 19 are disposed adjacent to entrance 26 on web receptacle 24. Stop surfaces 30, 31 are formed by the respective material projections 108, 109 of first component 12. Latching element receptacles 20, 21 are disposed on web 22.

Figure 9:
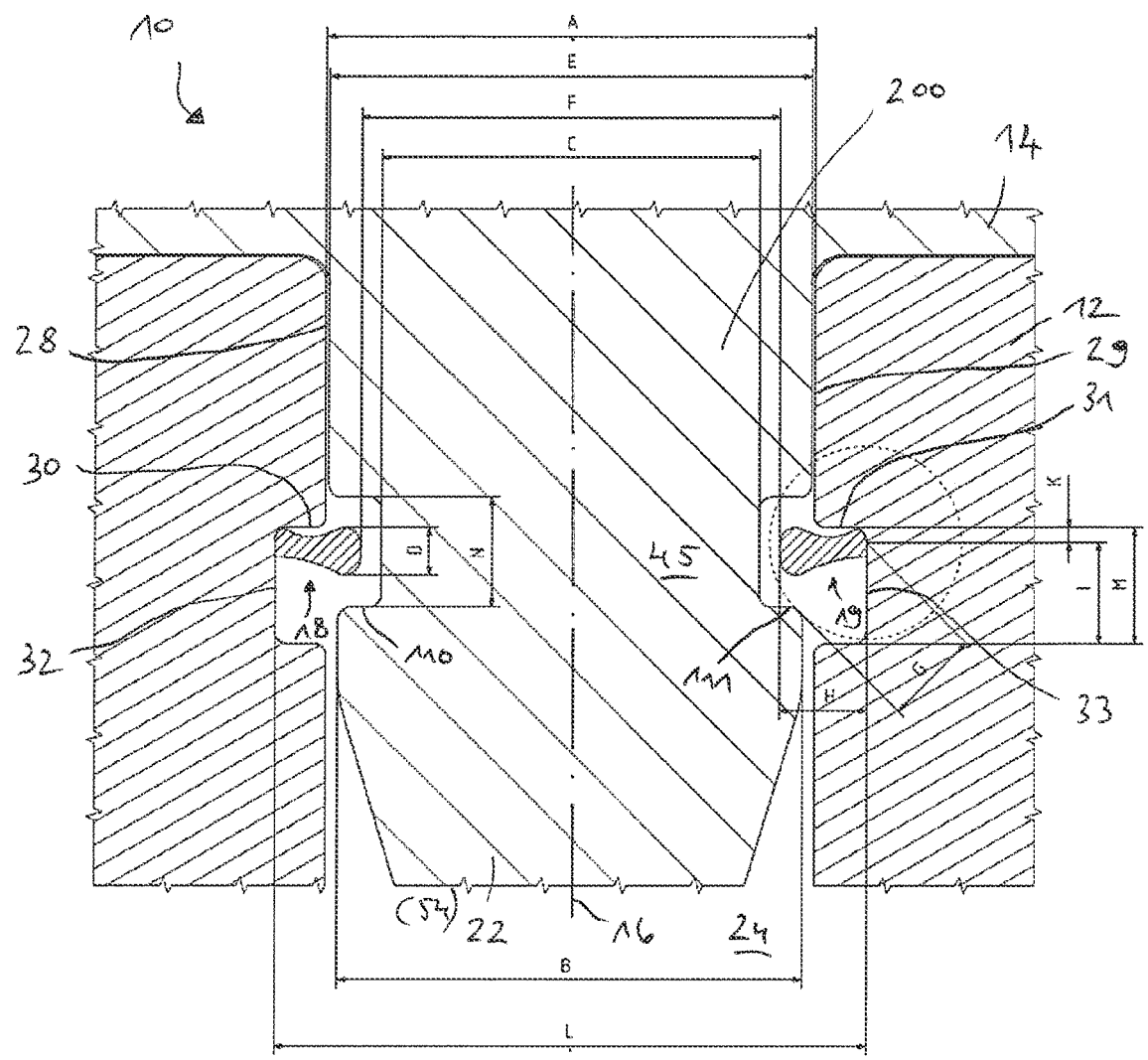
FIG. 9 is a cross-sectional view of the connection assembly of FIG. 6.

The knowledge gained from the explanations for FIG. 5 with respect to dimensioning rules is analogously applicable to the conditions prevailing in FIGS. 6 through 8. For example, in the case of the exemplary embodiment of FIGS. 6 through 8, it applies that the condition F/B<1 is a prerequisite for latching engagement of components 12, 14 (see also FIG. 9).

Figure 10:
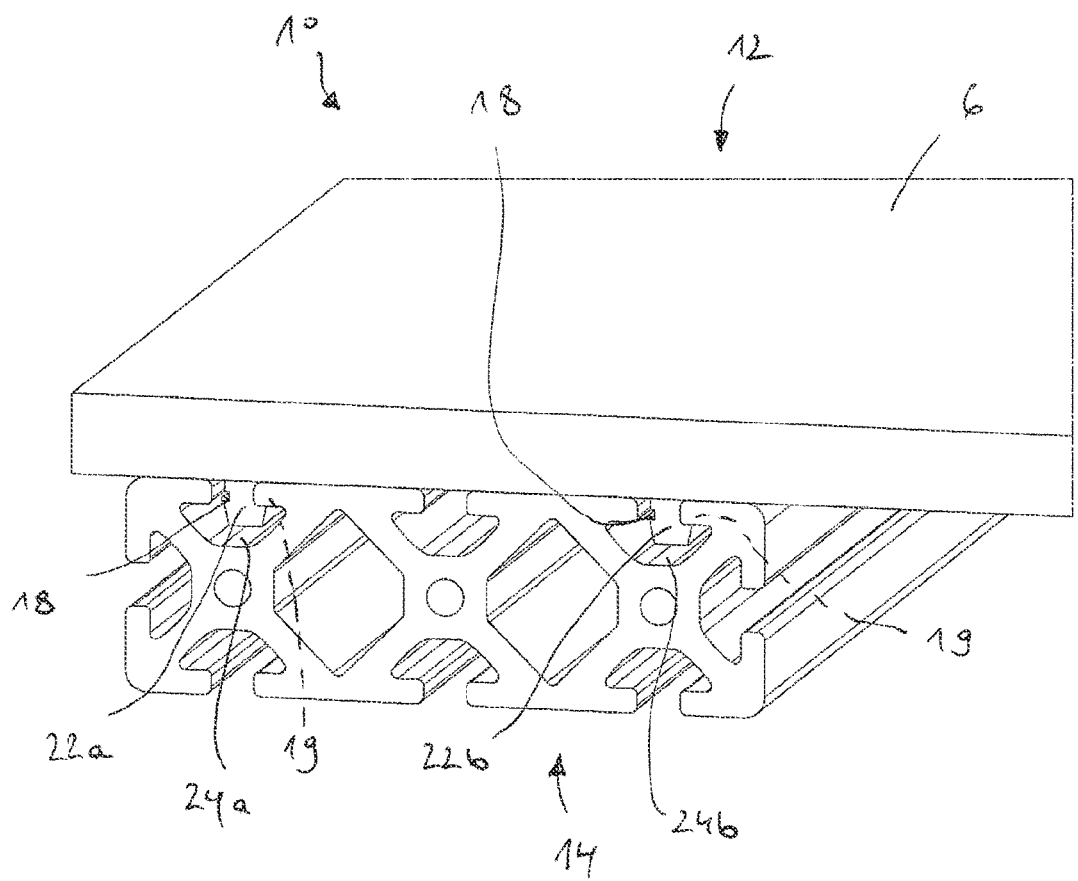
FIG. 10 is a perspective view of another embodiment of a connection assembly, where one of the components is configured as a plate-like flat body.

A further embodiment of a connection assembly 10, shown in FIG. 10, includes a first component 12 in the form of a plate-like flat body 6. Flat body 6 takes the form of, for example, a bottom plate.

Preferably, flat body 6 has a plurality of webs 22a, 22b which are offset relative to each other and each have latching elements 18, 19. As for the design and functioning of latching elements 18, 19, reference is made in particular to the above description relating to FIGS. 1 through 5.

Second component 14 has a plurality of web receptacles 24a, 24b which are offset relative to each other and each serve to accommodate one of the webs 22a, 22b.

Figure 11:
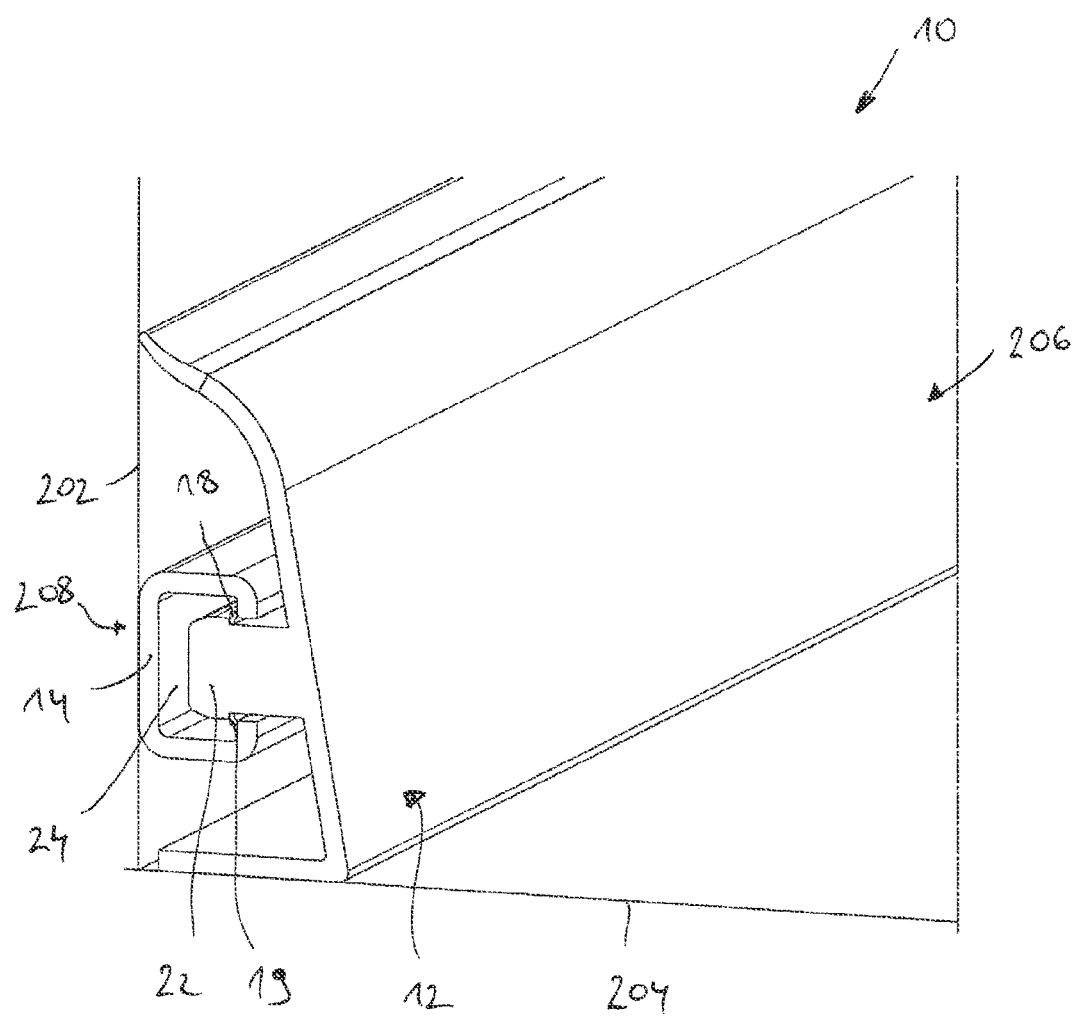
FIG. 11 is a perspective view of a further embodiment of a connection assembly, where one of the components is in the form of a baseboard.

A connection assembly 10 as shown in FIG. 11 is in particular suitable for use in a mounting area between a wall 202 and a floor 204. A first component 12 of connection assembly 10 is in the form of a baseboard 206. This component has a web 22 including latching elements 18, 19. Second component 14 is configured as a mounting strip 208 connected to wall 202. This mounting strip 208 encloses a web receptacle 24.

In order to install baseboard 206, it is pushed in a direction parallel to the plane of extension of floor 204 toward the wall 202, so that latching elements 18 and 19 latchingly engage with mounting strip 208 (see in particular the above description relating to FIGS. 1 through 5).

Figure 12:
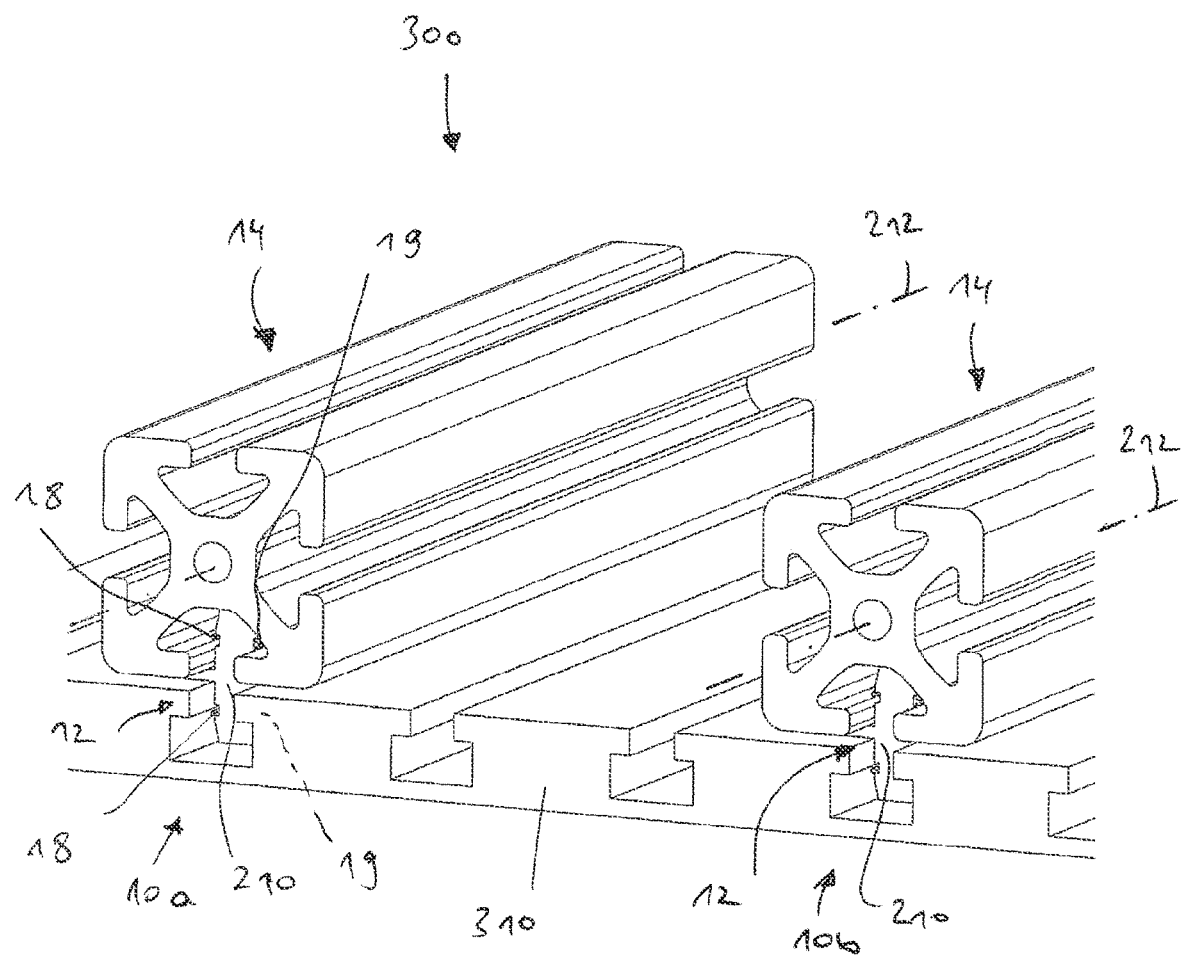
FIG. 12 is a perspective view of an embodiment of a connection system including a plurality of connection assemblies, where at least one of the components of each of the connection assemblies is in the form of a continuous profile, in particular in the form of a structural profile.

FIG. 12 shows a connection system 300 including a plurality of connection assemblies 10 (designated as 10a and 10b in FIG. 12). The respective first components 12 of connection assemblies 10a, 10b are configured as double-web strips, each having two pairs of latching elements 18 and 19. The double-web strips are latchingly engaged at one end with respective second components 14 of connection assemblies 10a, 10b and at the other end with a connecting panel 310 (as for the latching engagement, see in particular the above description relating to FIGS. 1 through 5).

Second components 14 are configured as structural profiles, in particular as ITEM or Bosch profiles. Second components 14 each extend along respective parallel longitudinal extension axes 212.

Figure 13:
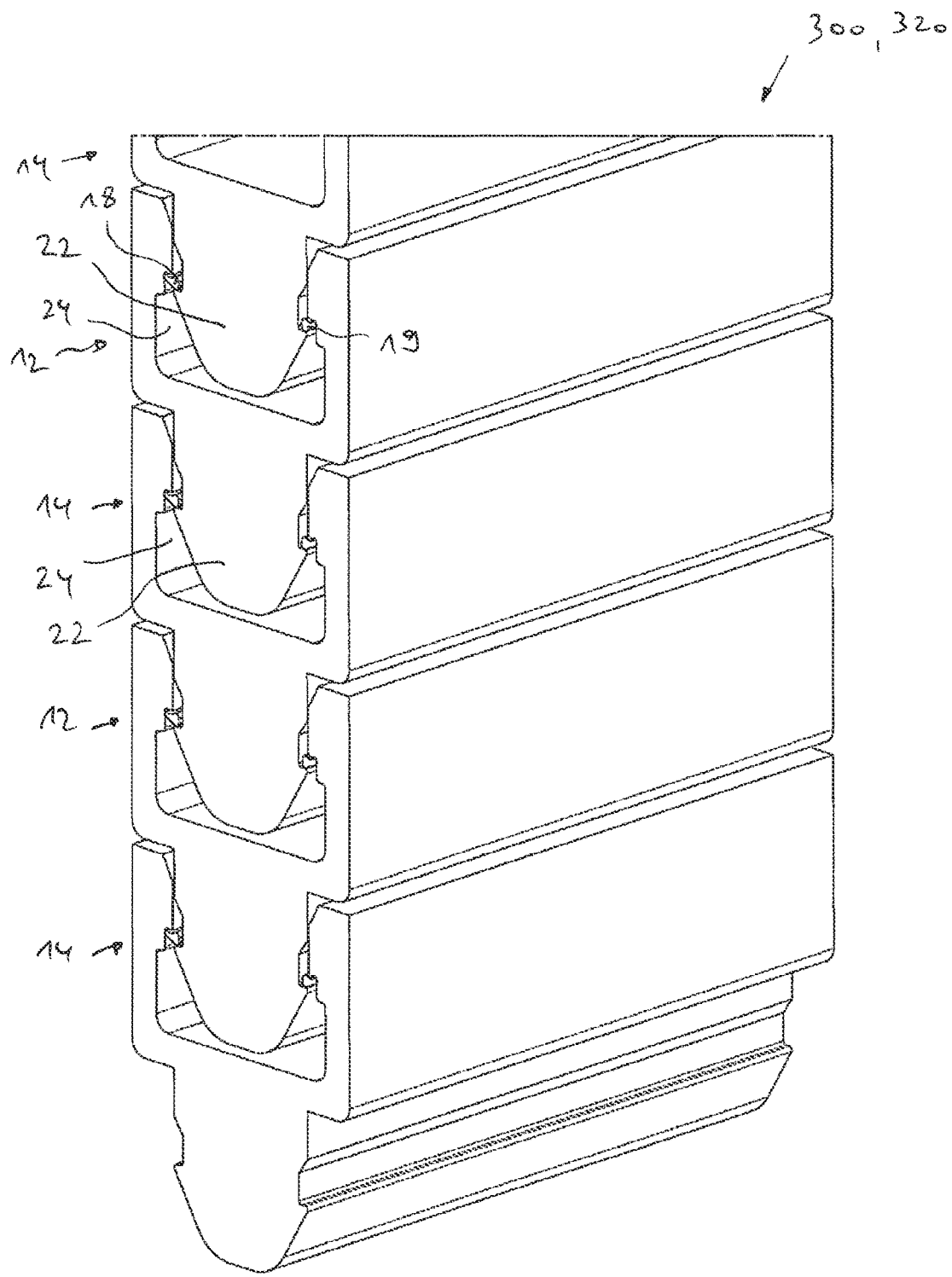
FIG. 13 is a perspective view of another embodiment of a connection assembly, whose components form a chain link assembly.

A connection system 300 shown in FIG. 13 is configured as a chain link assembly 320. Preferably, all components 12 and 14 are identical. This means that each of the components 12, 14 has both a web 22 and a web receptacle 24, the actual latching engagement being accomplished by means of latching elements 18 and 19 in the manner described above with reference to FIGS. 1 through 5.

Figure 14A:
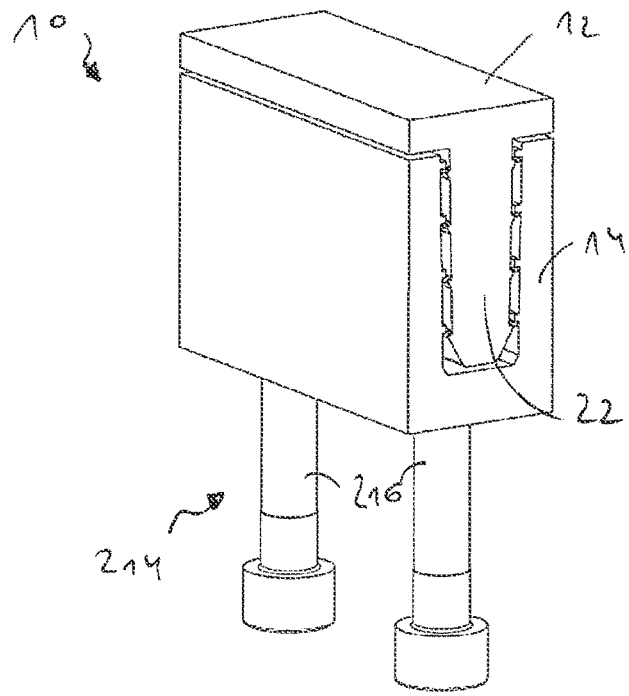
FIGS. 14a and 14b are perspective views showing a further embodiment of a connection assembly, which includes a relative position adjustment device, in an assembled state and in a disassembly phase.
Figure 14B:
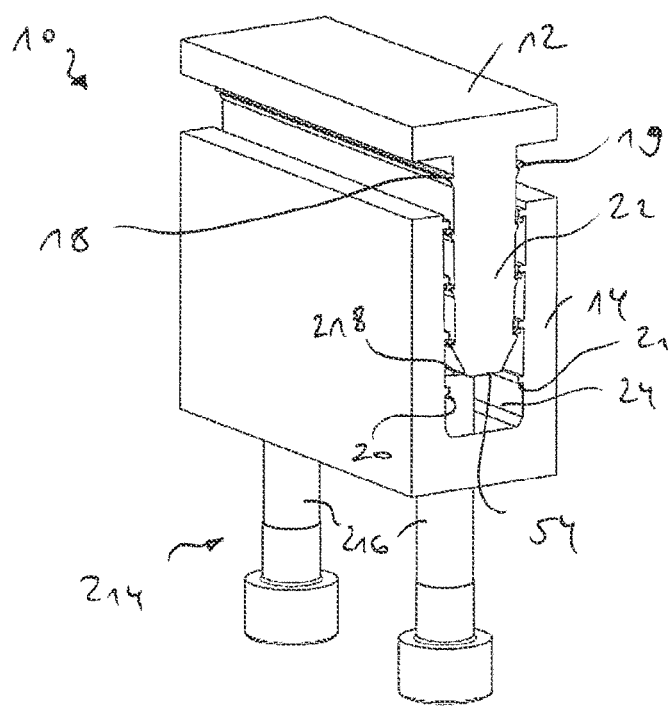

FIGS. 14a and 14b show an example of a connection assembly 10 which includes a relative position adjustment device 214. This relative position adjustment device 214 includes at least one push-out element 216, which, for example, is disposed on second component 14 and is movable relative to this component.

The at least one push-out element 216 has at least one push-out face 218, which is in direct contact with a surface of the other component (here first component 12) in order to move first component 12 relative to second component 14, in particular to be able to push first component 12 with its web 22 out of the web receptacle 24 of second component 14. Thus, relative position adjustment device 214 acts as a disassembly device. This is particularly advantageous when a stable connection between a first component 12 and a second component 14 is created by the first component 12 not having only a single pair of latching elements 18, 19 capable of latching engagement with a single pair of latching element receptacles 20, 21 of the second component 14, but rather by providing respective pluralities of pairs of latching elements and pairs of latching element receptacles (see FIGS. 14a and 14b). As for the latching engagement, see in particular the above description relating to FIGS. 1 through 5.

Figure 15:
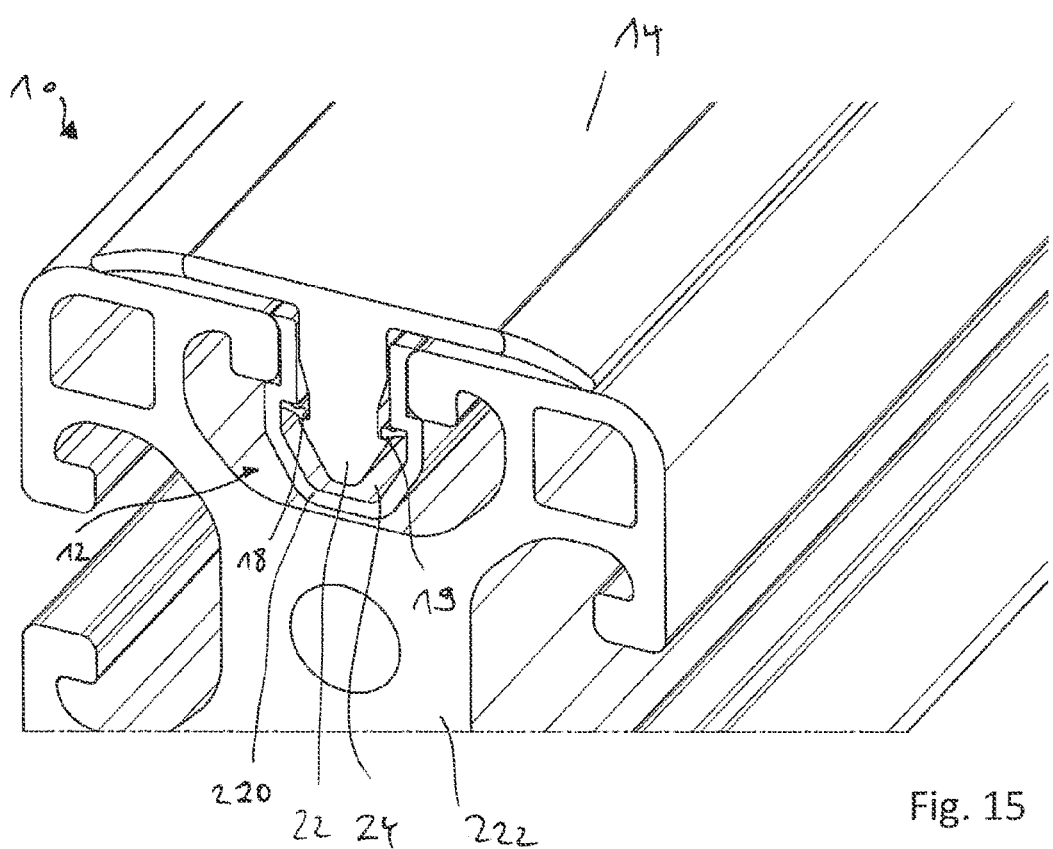
FIG. 15 is a perspective view of another embodiment of a connection assembly, which includes an adapter-like intermediate part.

An embodiment of a connection assembly 10 illustrated in FIG. 15 includes a first component 12 in the form of an adapter-like intermediate part 220. This adapter-like intermediate part 220 is substantially U-shaped and bounds a web receptacle 24 for a web 22 of a second component 14. Adapter-like intermediate part 220 is in turn preferably held on an additional part 222, for example a structural profile, in particular an ITEM profile or a Bosch profile.

In the exemplary embodiment shown in FIG. 15, adapter-like intermediate part 220 carries the latching elements 18 and 19, so that adapter-like intermediate part 220 corresponds to the first component 12 of connection assembly 10. This arrangement corresponds to the exemplary embodiment according to FIGS. 6 through 8. However, it is also possible that the configuration of latching elements 18, 19 and latching element receptacles 20, 21 of the exemplary embodiments according to FIGS. 1 through 5 may be used.

Figure 16A:
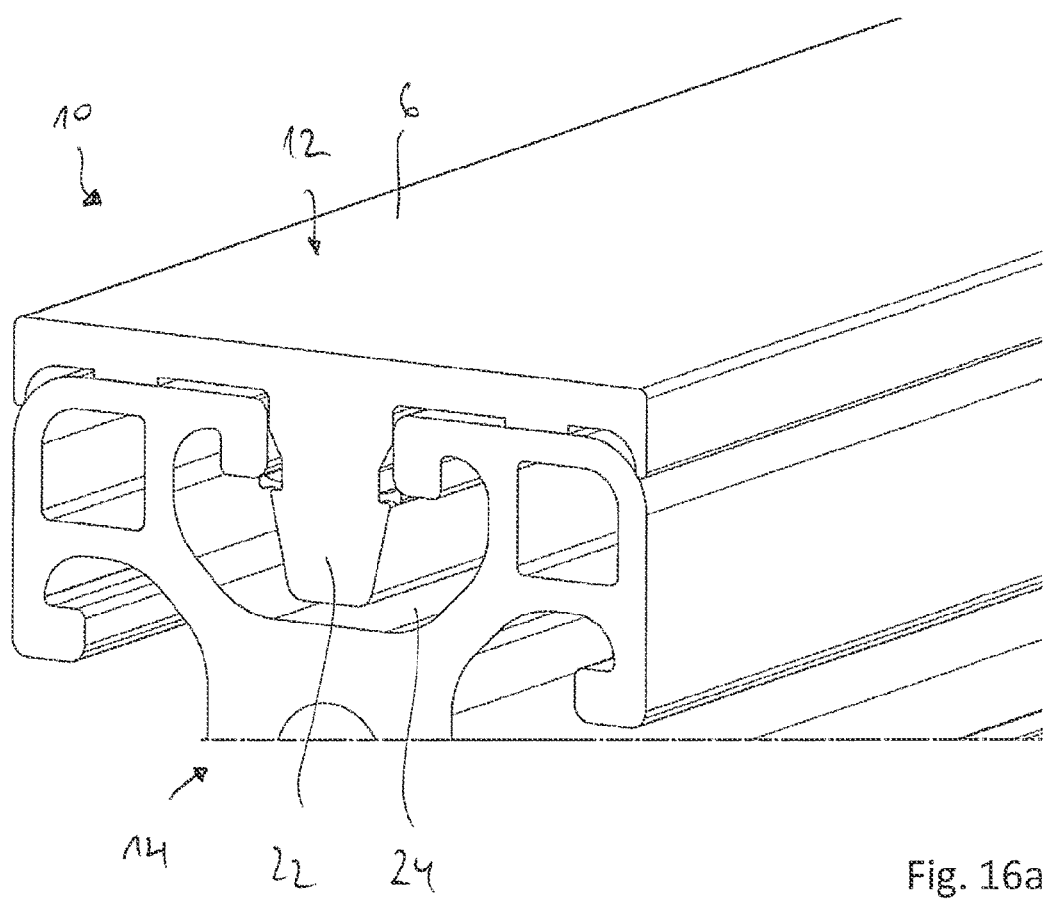
FIG. 16a is a perspective view of another embodiment of a connection assembly, where one of the components is configured as a plate-like, elastically flexible flat body.
Figure 16B:
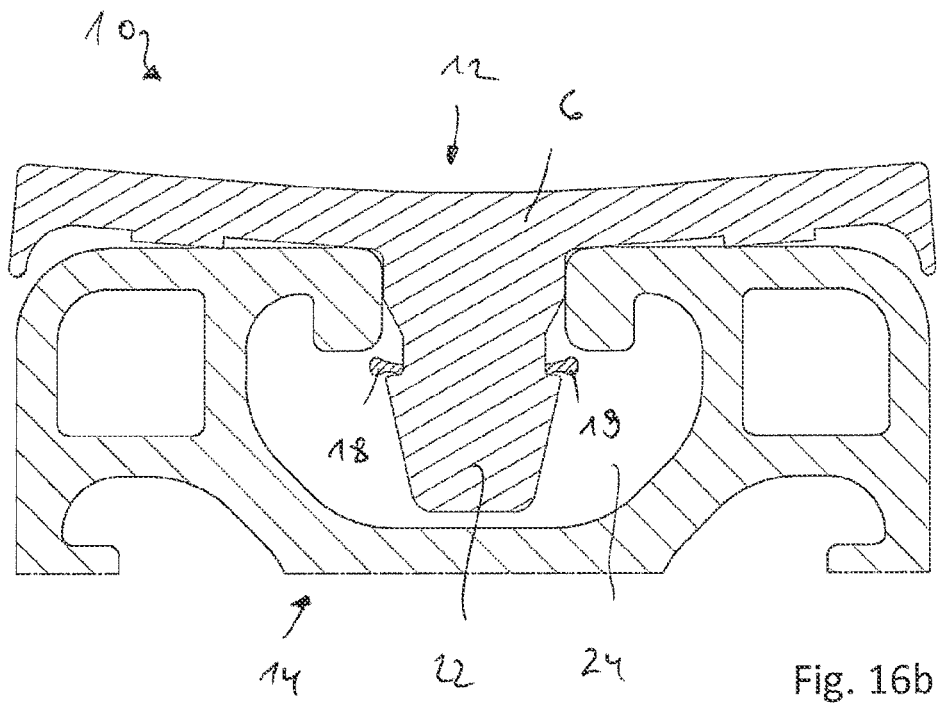
Figure 16C:
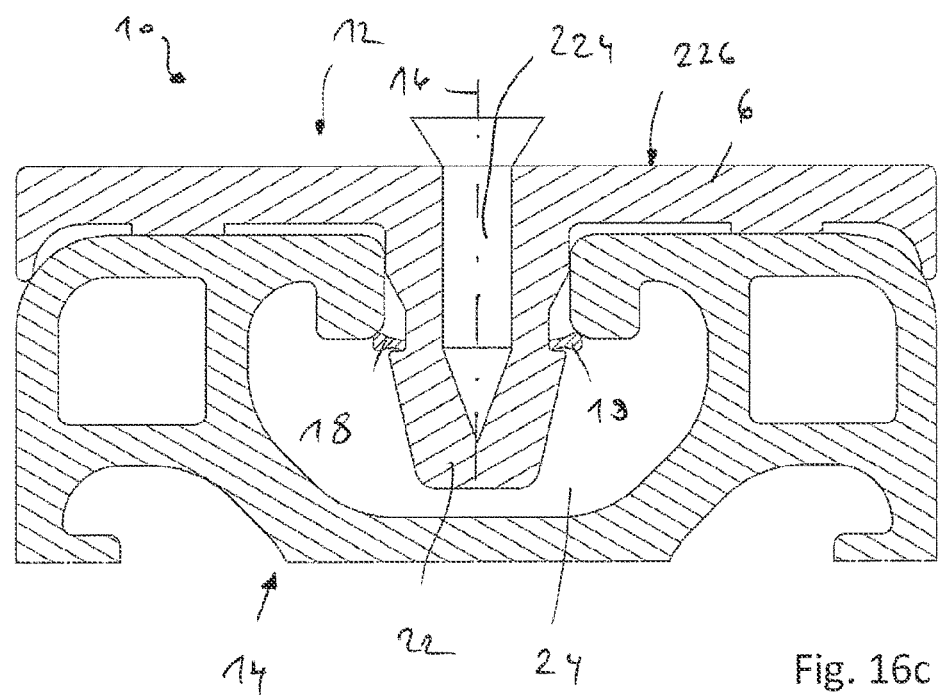
FIG. 16c is a view corresponding to FIG. 16b showing an alternative embodiment.

The embodiments of connection assemblies 10 shown in FIGS. 16a through 16c each include a first component 12 in the form of a plate-like flat body 6 that covers a long side of a second component 14 which is in the form of a structural profile, in particular an ITEM or Bosch profile.

It is possible for flat body 6 to be made of a rigid, non-flexible material (see FIG. 16a) or of an elastically flexible material (see FIG. 16b).

For example, flat body 6 may be made of an elastomeric material. In order to disassemble such a flat body 6, it may suffice to push it deeper into a web receptacle 24 of second component 14 in the area of a web 22 so that latching elements 18, 19 are released. To increase disassembly forces, it is possible to use a pin or wedge element 224 acting between latching elements 18 and 19. This pin or wedge element 224 can be inserted (also posteriorly) from an outer side 226 of the first component 12 facing away from second component 14. In the assembled state, pin or wedge element 224 stabilizes a distance between the latching elements 18 and 19 measured perpendicular to the plane of relative movement 16 (see FIG. 16c). As for the design and functioning of the latching engagement, reference is made in particular to the above description relating to FIGS. 1 through 5

Figure 17A:
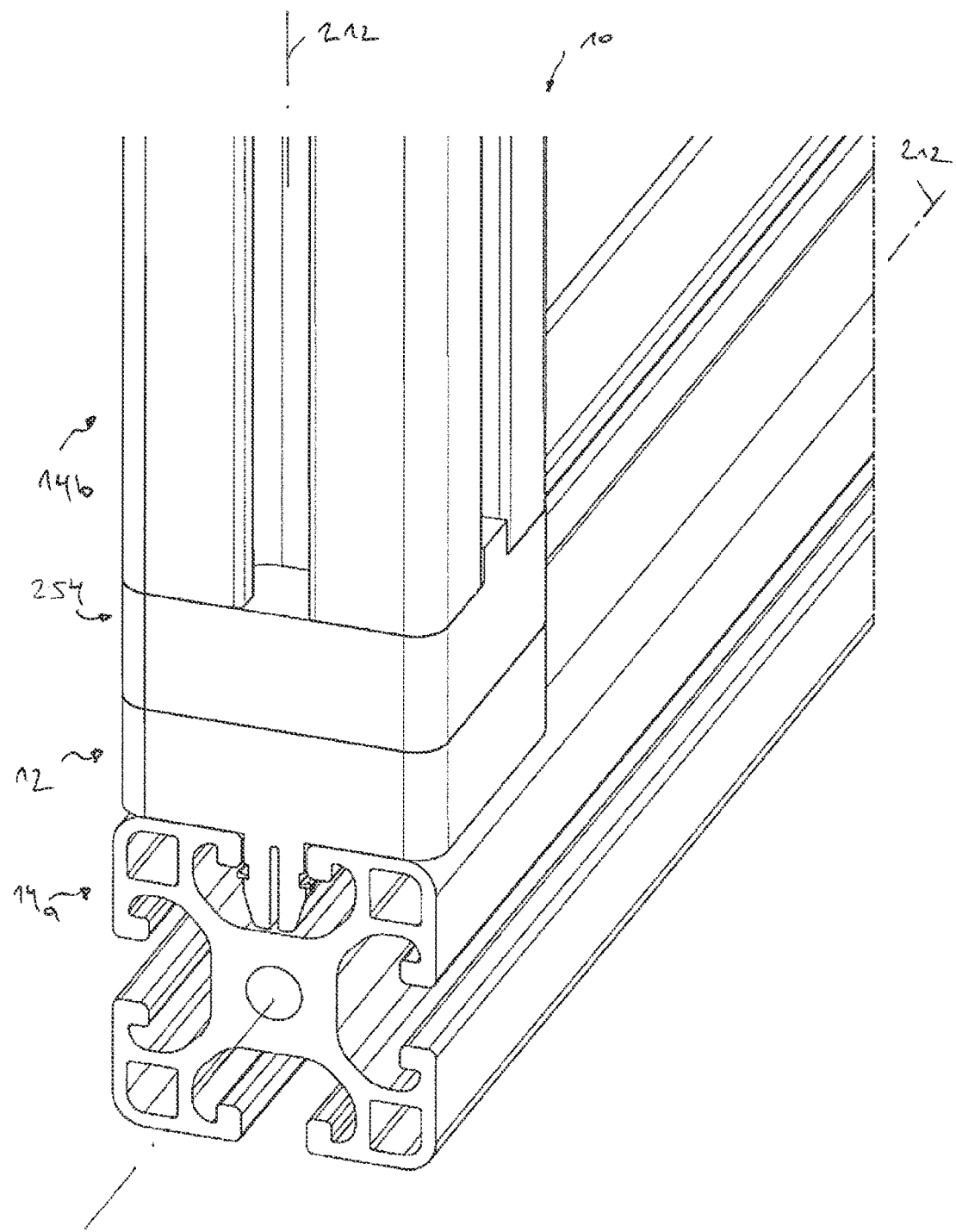
FIG. 17a is a perspective view showing an embodiment of a connection system with two connection assemblies.
Figure 17B:
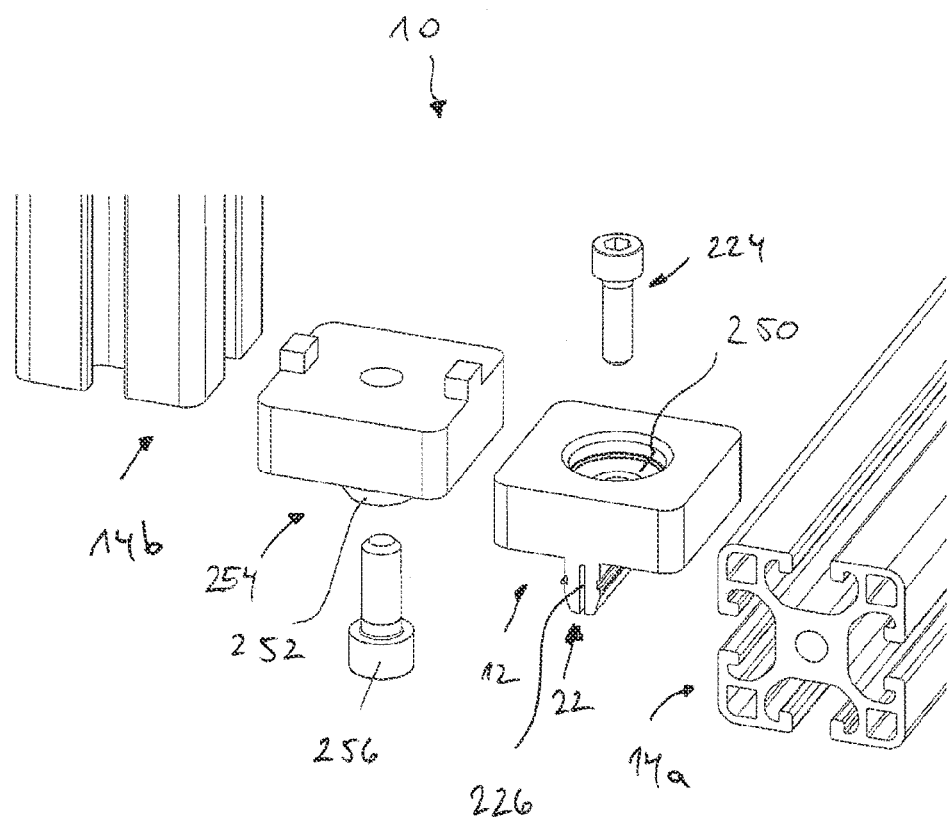
Figure 17C:
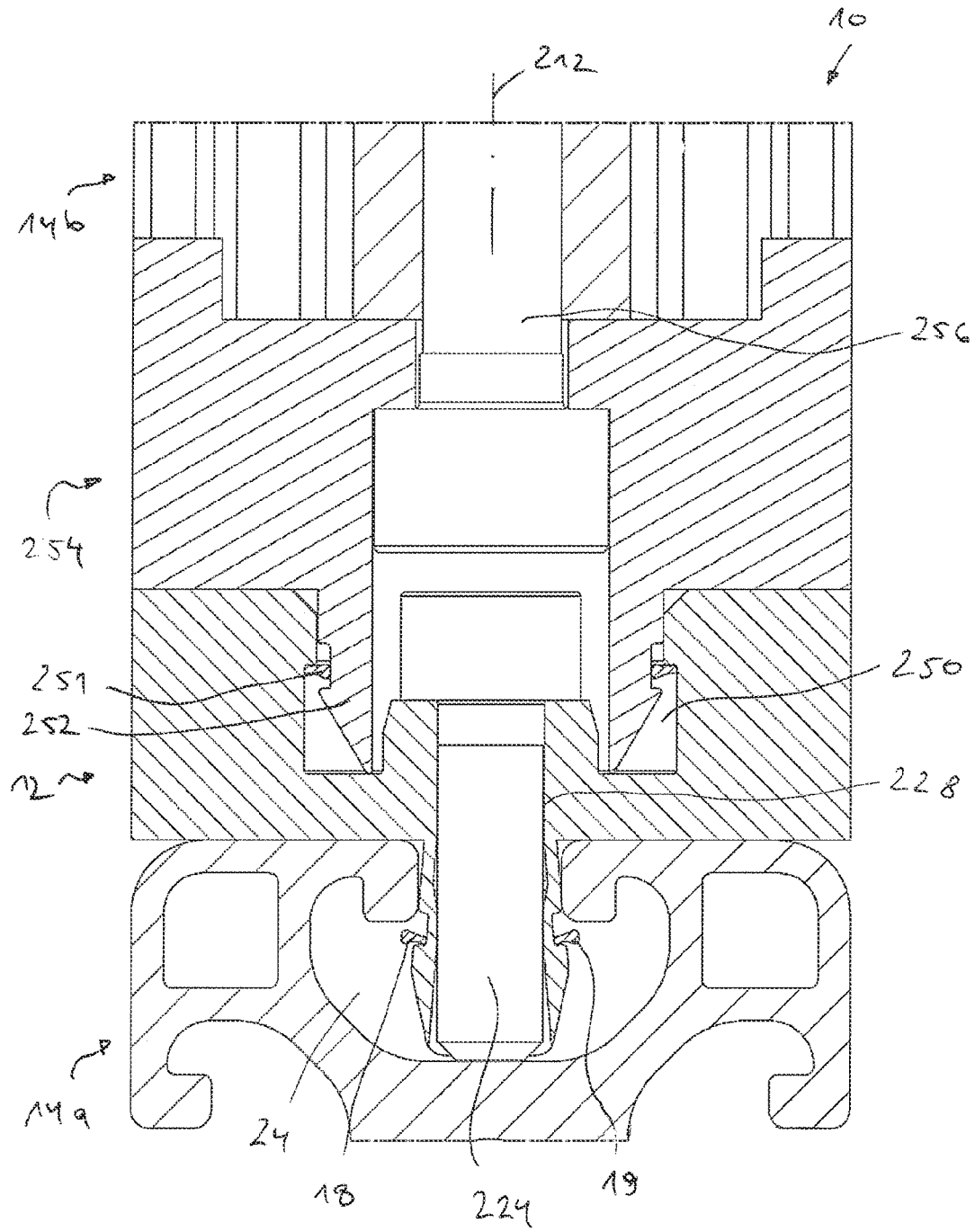

An exemplary embodiment of a connection assembly shown in FIGS. 17a through 17c includes two second components 14a and 14b in the form of structural profiles. These structural profiles extend along respective longitudinal extension axes 212 which are perpendicular to each other.

A web of a first component 12, designated 22 in FIG. 17b, has a longitudinal slit 226 which allows simplified mounting of first component 12 to second component 14a. As for the design and functioning of the latching engagement, reference is made in particular to the above description relating to FIGS. 1 through 5.

To enhance the stability of the assembled state (see FIG. 17c) a pin or wedge element 224 may be used, which may be in the form of a screw and capable of being threadedly connected to a screw receptacle 228 of first component 12.

For purposes of connecting first component 12 to second component 14b, first component 12 has an annular latching receptacle 250 facing away from second component 14 and having an annular latching lip 251. This latching lip 251 latchingly engages with a latching head 252 of an intermediate part 254, which is connected to an end portion of second component 14b by means of a screw 256.

Figure 18:
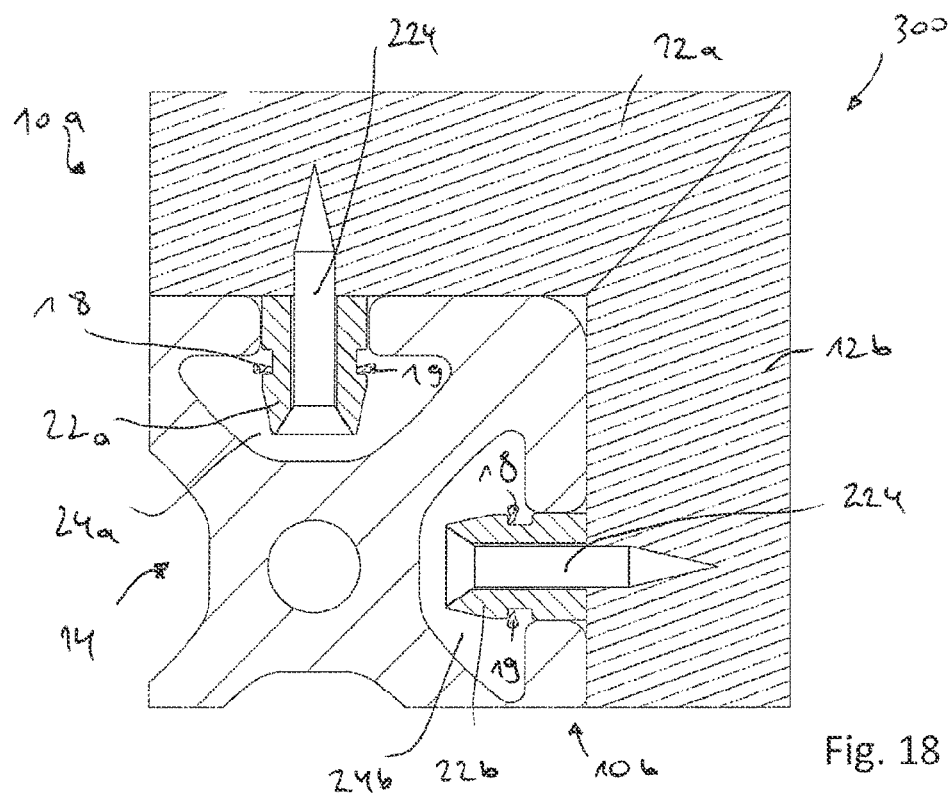
FIGS. 18 through 21 are cross-sectional views of further embodiments of connection systems with two connection assemblies.
Figure 19:
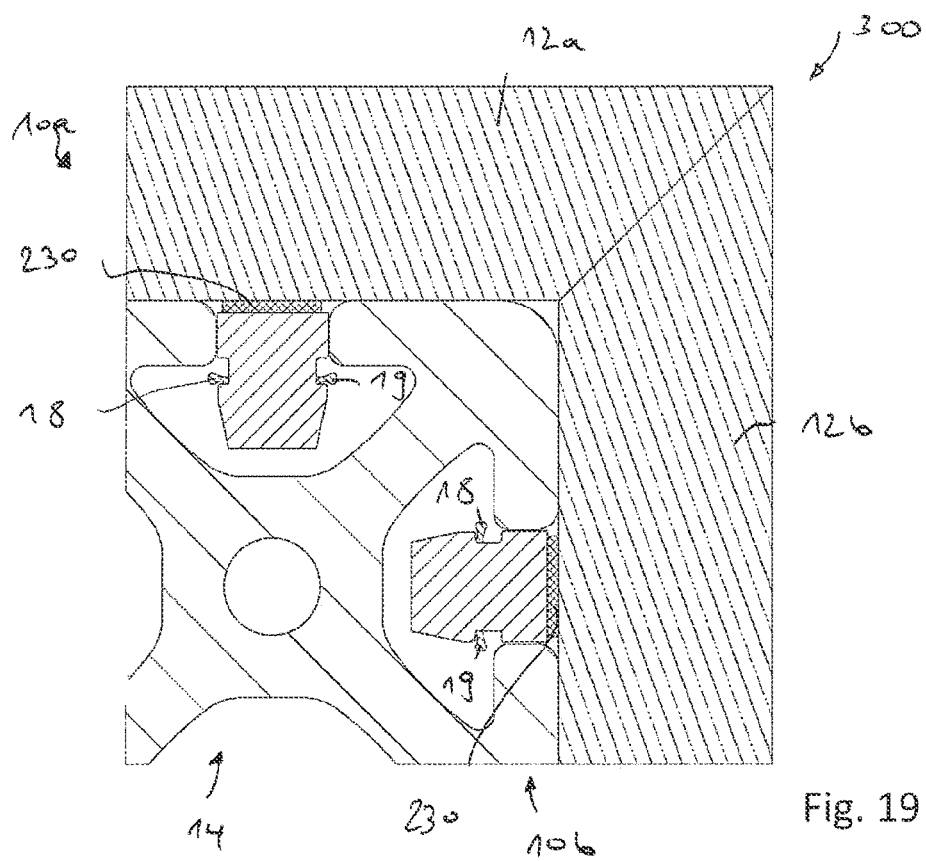
Figure 20:
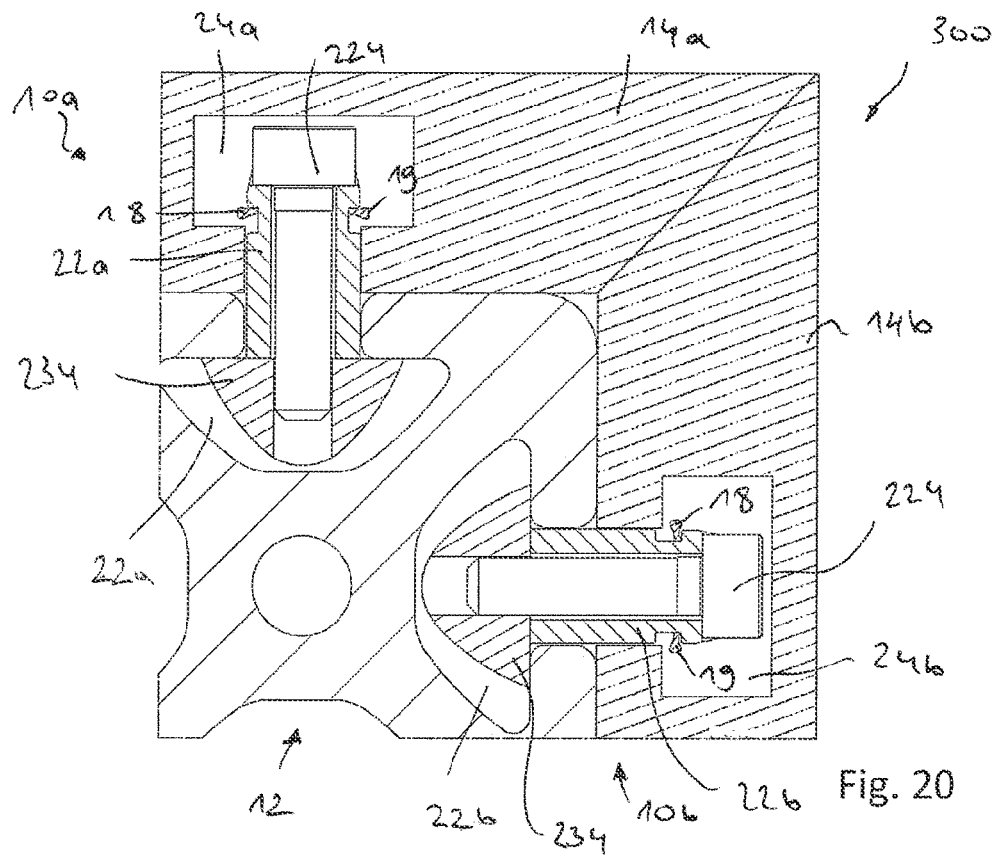
Figure 21:
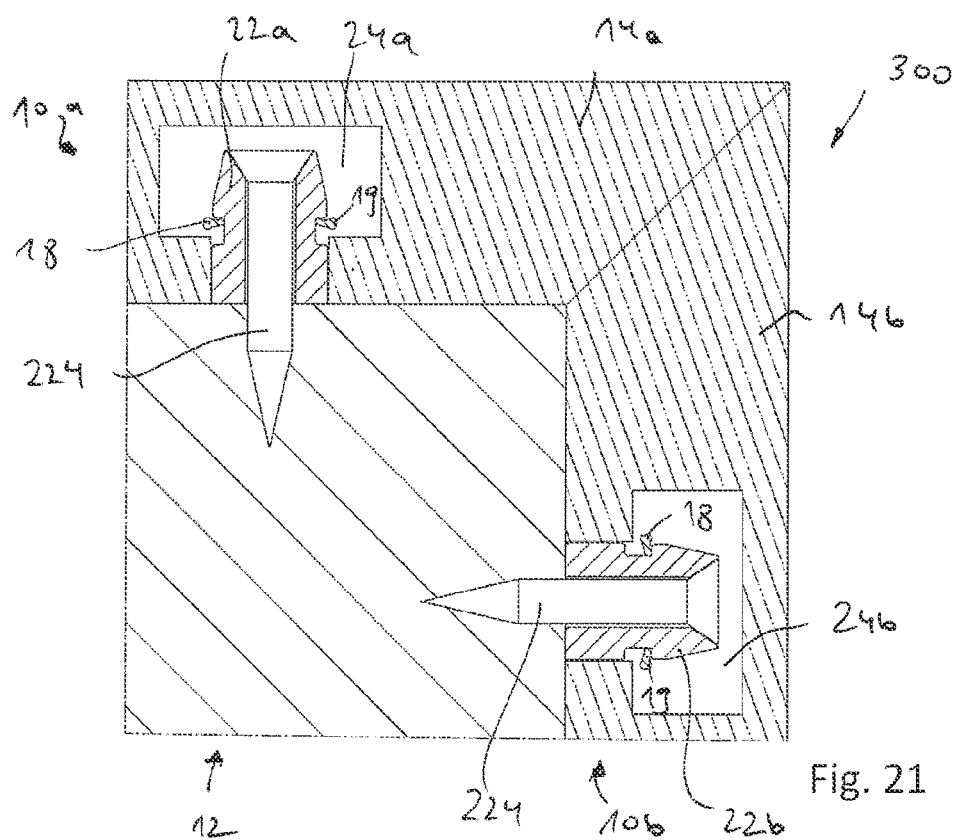
Figure 22A:
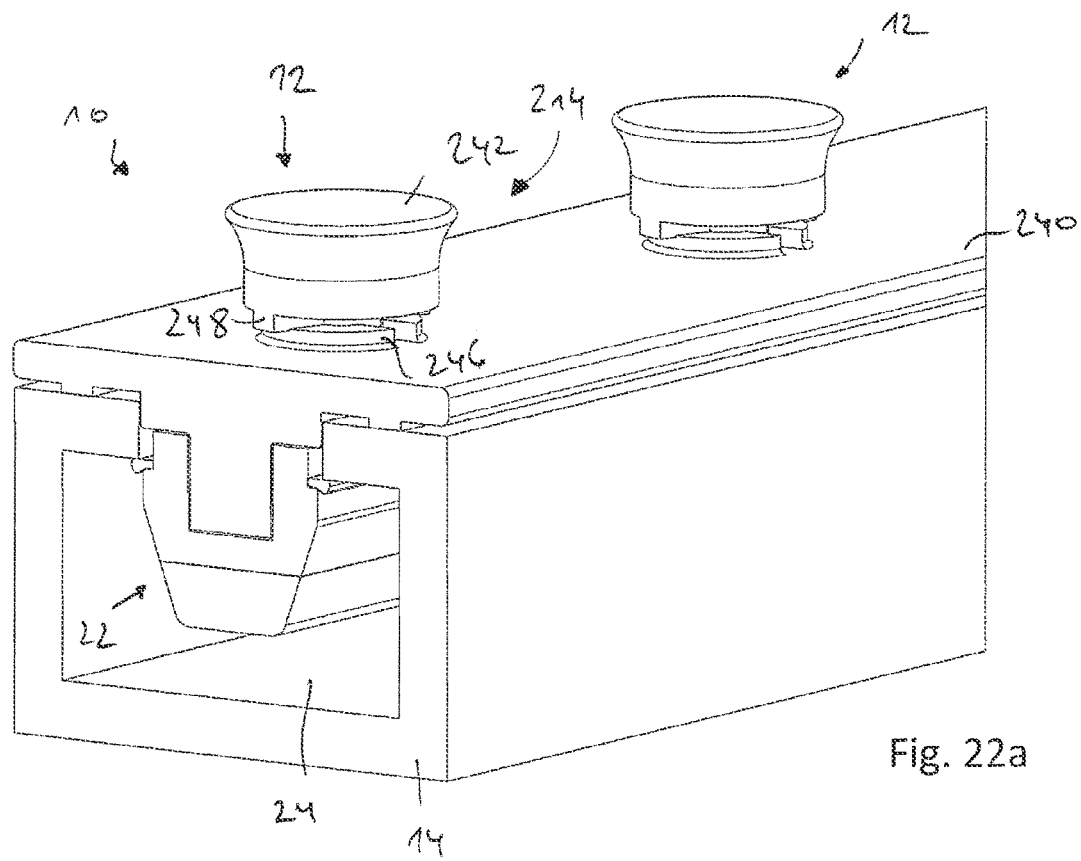
FIGS. 22a, 22b are perspective views showing another embodiment of a connection assembly with a relative position adjustment device.
Figure 22B:
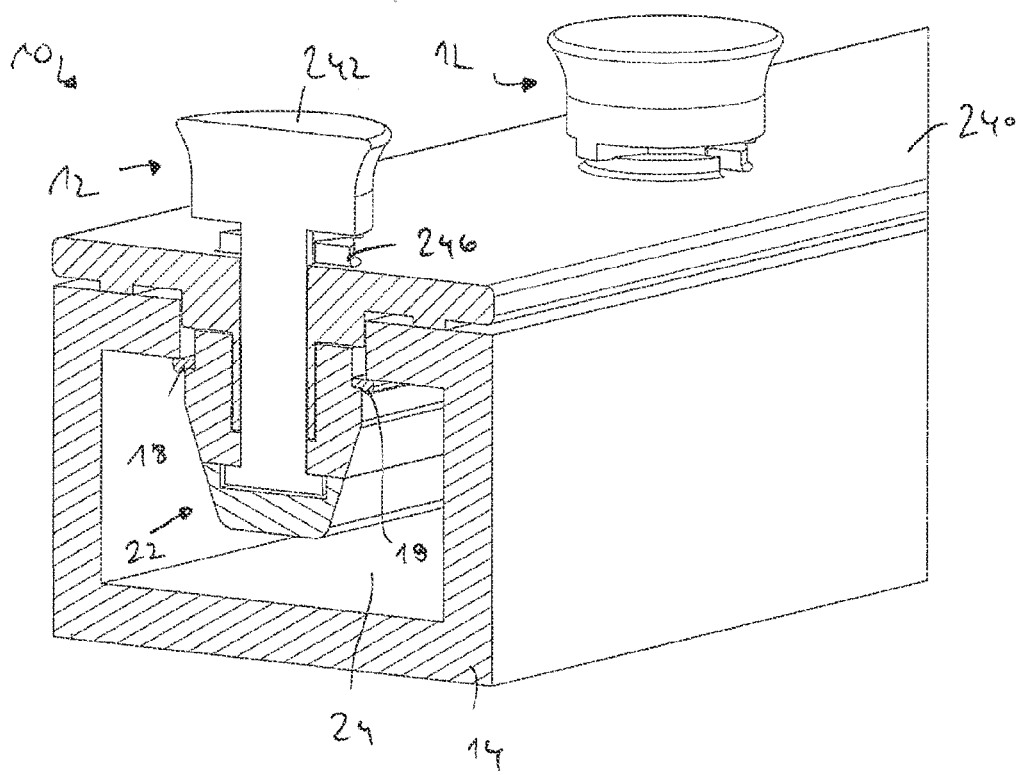
Figure 22C:
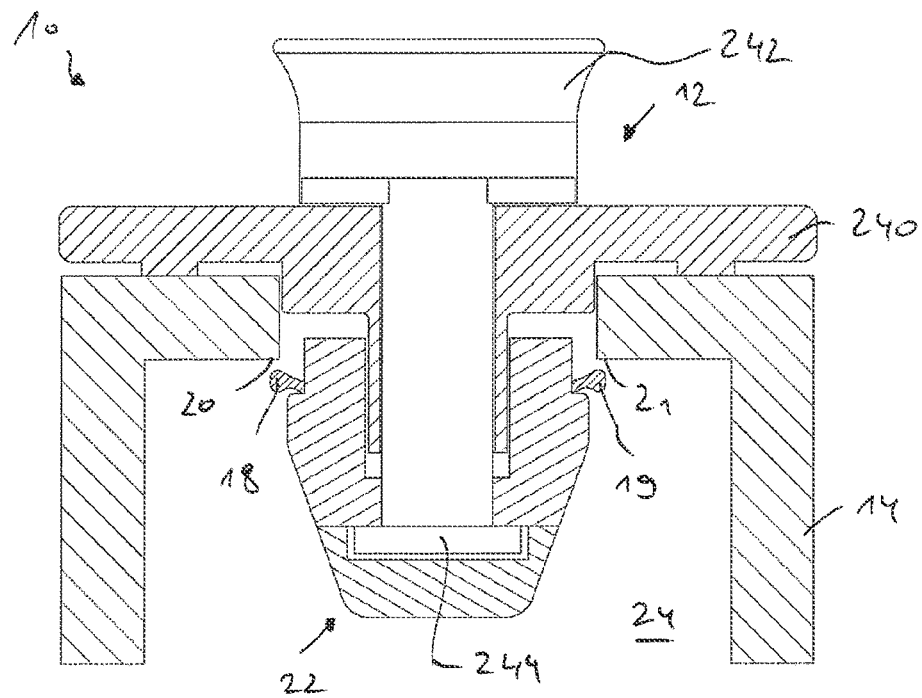
FIGS. 22c, 22d are cross-sectional views of the connection assembly of FIGS. 22a, 22b.
Figure 22D:
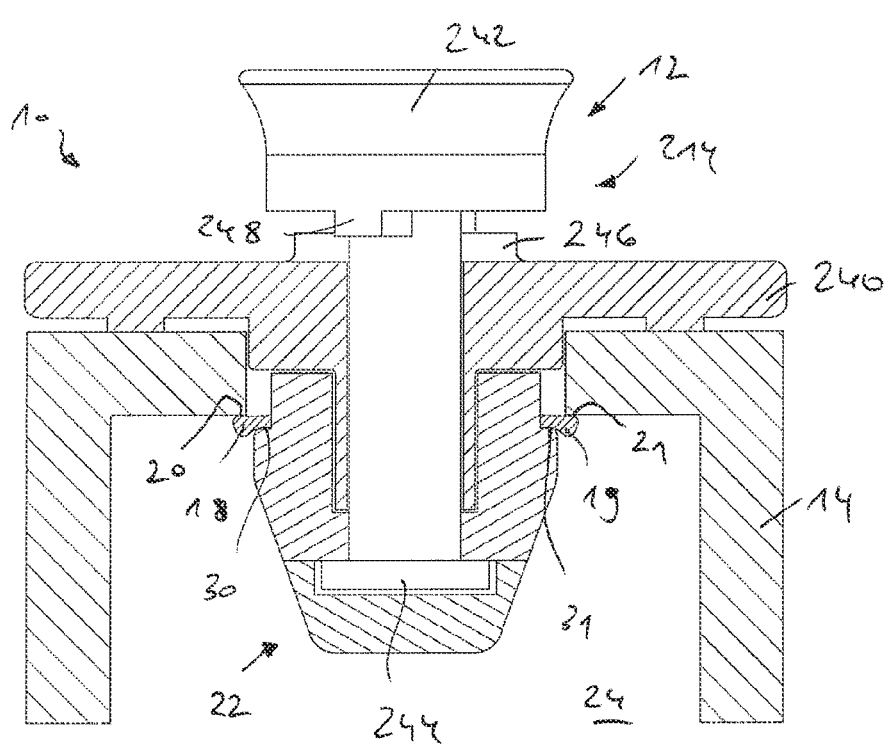

FIGS. 18 through 21 show different connection systems 300 with at least two connection assemblies 10a, 10b. In each case, one of the components 12, 14 is associated with both connection assemblies 10a and 10b. In the example of FIGS. 18 and 19, this is second component 14. In the example of FIGS. 20 and 21, this is first component 12.

The arrangements shown in FIGS. 18 through 21 are particularly suitable for corner joints where ends are abutted against one another, for example for two first components 12a, 12b (see FIGS. 18 and 19) or for two second components 14a and 14b (see FIGS. 20 and 21). In each case, the component that is shared by two connection assemblies 10a, 10b is preferably in the form of a structural profile that preferably has web receptacles 24a, 24b which are preferably open in directions offset by 90° (see FIGS. 18 and 19). Webs 22a, 22b may be fixed to the first components 12a, 12b by using pin or wedge elements 224 in the manner described above (see FIG. 18) or also, for example, by using adhesive joints 230, (see FIG. 19).

In case the second components 14a, 14b arranged with their ends abutted against one another have web receptacles 24a, 24b (see FIGS. 20 and 21), webs 22a, 22b may be fixed to first component 12 using pin or wedge elements 224, especially if first component 12 is in the form of a solid profile, in particular a timber profile (see FIG. 21).

In case the first component 12 is in the form of a structural profile, the web receptacles 24a, 24b of such a profile may be used to accommodate fastening elements 234 for securing in place the webs 22a, 22b carrying the latching elements 18, 19, preferably by means of a pin or wedge element 224 (see FIG. 20).

As for the design and functioning of the latching engagement of the latching elements 18, 19 of the exemplary embodiments of FIGS. 18 through 21, see in particular the above description relating to FIGS. 1 through 5).

In a connection assembly 10 shown in FIGS. 22a through 22d, at least one first component 12 is provided which has sections that are movable relative to one another. A first section is formed by web 22, which carries latching elements 18 and 19. Further provided is an intermediate section 240 which covers second component 14 and its web receptacle 24. Finally, an actuating section 242 is provided which extends through intermediate section 240 and has a lifter dog 244 which is rotatable relative to web 22.

Intermediate section 240 has spacer elements 246 on its outer side facing second component 14. These spacer elements 246 cooperate with clearance-compensating elements 248 of actuating section 242. The connection assembly 10 according to FIGS. 22a through 22d thus has a relative position adjustment device 214 including the elements 242, 246 and 248.

In order to assemble first component 12 and second component 14, the web 22 of first component 12 is inserted into web receptacle 24. If, in this process, a rotational position of actuating section 242 is selected such that clearance-compensating elements 248 and spacer elements 246 are offset relative to each other in the direction of rotation (see FIG. 22c), then web 22 can be inserted so deep into web receptacle 24 that latching elements 18, 19 are spaced a distance from latching element receptacles 20, 21 of second component 14.

In a subsequent clearance-compensation step, actuating section 242 can be lifted and rotated so that clearance-compensating elements 248 are positioned relative to spacer elements 246 in such a way that they rest on one another. In this position, lifter dog 244 of actuating section 242 retains web 22 in a position in which latching elements 18, 19 are in contact with latching element receptacles 22, 21 of second component 14.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A connection assembly comprising:
a first component in a form of an elongated body, the first component extending along a first longitudinal extension axis; and
a second component in a form of an elongated body, the second component extending along a second longitudinal extension axis,
wherein the first and second components, starting from a separated disassembled state, are joinable to each other along a plane of relative movement parallel to respective planes of extension of the first and second components, into an interconnected assembled state, and back into the disassembled state,
wherein the first component has at least one latching element on either side of the plane of relative movement, and the second component has two latching element receptacles,
wherein, in the assembled state, each of the latching element receptacles cooperates with a respective latching portion of a respective one of the latching elements, each of the latching portions being movable along a movement path starting from a non-deformed rest state, the movement path having at least a component parallel to the plane of relative movement, a first portion of the movement path pointing in a disassembly direction with respect to the rest state, and a second portion of the movement path pointing in an assembly direction opposite the disassembly direction with respect to the rest state, and the first portion of the movement path being limited by stop surfaces against which the respective latching elements rest in a course of disassembling the first and second components.

2. The connection assembly as recited in claim 1, wherein:
the latching elements of the connection assembly are oriented such that the latching elements do not intersect the plane of relative movement and/or in that the latching elements are each exclusively disposed on a respective one of the two sides of the plane of relative movement, and/or
the connection assembly does not have any latching element extending through the plane of relative movement.

3. The connection assembly as recited in claim 1, wherein the stop surfaces each extend transversely to the plane of relative movement.

4. The connection assembly as recited in claim 1, wherein at least one of the first and second components is a structural profile.

5. The connection assembly as recited in claim 4, wherein the first and second longitudinal extension axes are parallel to the plane of relative movement.

6. The connection assembly as recited in claim 4, wherein the elongated body of at least one of the first and second components is produced by cutting a continuous body into lengths.

7. The connection assembly as recited in claim 6, wherein the continuous body is produced by extrusion.

8. The connection assembly as recited in claim 1, wherein cross sections of the elongated body of at least one of the first and second components which are offset from one another along the respective longitudinal extension axis of the elongated body are identical.

9. The connection assembly as recited in claim 1, wherein one of the first and second components has a groove-shaped web receptacle having a web receptacle width in a direction perpendicular to the plane of relative movement, the web receptacle being accessible to a free end of a web of the other one of the first and second components through an entrance having an entrance width in a direction perpendicular to the plane of relative movement, the free end having a maximum head width in a direction perpendicular to the plane of relative movement, the free end being disposed adjacent to a web stem of reduced cross section having a width in a direction perpendicular to the plane of relative movement, and the latching portions of the latching elements each having a thickness in a direction parallel to the plane of relative movement.

10. The connection assembly as recited in claim 9, wherein two times the thickness equal to or greater than a difference between the entrance width and the head width.

11. The connection assembly as recited in claim 9, wherein:
two times the thickness is no greater than a difference between the entrance width and the stem width, and/or
two times the thickness is no greater than a difference between the web receptacle width and the head width.

12. The connection assembly as recited in claim 1, wherein:
at least one of the first and second components is a plate-like flat body or a baseboard, or is formed by a double-web strip or by an adapter-like intermediate part, or
the first and second components form chain links of a chain link assembly.

13. The connection assembly as recited in claim 1, further comprising a relative position adjustment device that is at least indirectly connected to the first component or to the second component, and is configured to adjust a relative position of at least a portion of the first component and at least a portion of the second component along an assembly/disassembly axis parallel to the plane of relative movement when the connection assembly is in the assembled state.

14. The connection assembly as recited in claim 13, wherein the relative position adjustment device is configured to act as a disassembly device by which the connection assembly is transferrable from the assembled state into the disassembled state.

15. The connection assembly as recited in claim 13, wherein the relative position adjustment device is configured to act as a clearance-compensating device by which an assembly clearance between one of the latching elements and a respective one of the latching element receptacles can be compensated.

16. The connection assembly as recited in claim 1, further comprising a pin or wedge element acting between the latching elements for adjusting a distance between the latching elements.

17. The connection assembly as recited in claim 1, wherein the first and second longitudinal extension axes are perpendicular, parallel or collinear to one another.

18. A connection system comprising at least two connection assemblies according to claim 1.

19. The connection system as recited in claim 18, wherein one of the first and second components is part of both of the connection assemblies at the same time.

20. The connection assembly as recited in claim 1, wherein the first component has a web extending parallel to the first longitudinal extension axis, and the second component has a web receptacle extending parallel to the second longitudinal extension axis.

21. The connection assembly as recited in claim 20, wherein, in a cross-section of the first component, the web extends starting from a free end as far as two material projections that are each adjoined by an inwardly offset side surface of a web stem of the web, and wherein a respective one of the latching elements is arranged in a region of each transition between a respective material projection and the web stem.

* * * * *